US012606468B2

(12) United States Patent
Peller

(10) Patent No.: US 12,606,468 B2
(45) Date of Patent: Apr. 21, 2026

(54) METHODS FOR THE FORMATION OF NANOPLASTICS AND THE AGGLOMERATION/REMOVAL OF MICRO- AND NANOPLASTICS IN WATER

(71) Applicant: Valparaiso University, Valparaiso, IN (US)

(72) Inventor: Julie Rae Peller, Valparaiso, IN (US)

(73) Assignee: Valparaiso University, Valparaiso, IN (US)

( * ) Notice: Subject to any disclaimer, the term of this patent is extended or adjusted under 35 U.S.C. 154(b) by 623 days.

(21) Appl. No.: 18/073,783

(22) Filed: Dec. 2, 2022

(65) Prior Publication Data

US 2023/0174397 A1 Jun. 8, 2023

Related U.S. Application Data

(60) Provisional application No. 63/342,920, filed on May 17, 2022, provisional application No. 63/285,748, filed on Dec. 3, 2021.

(51) Int. Cl.
*C02F 1/52* (2023.01)
*C02F 1/00* (2023.01)
(Continued)

(52) U.S. Cl.
CPC ............ *C02F 1/5272* (2013.01); *C02F 1/001* (2013.01); *C02F 2101/32* (2013.01); *C02F 2101/34* (2013.01); *C02F 2103/007* (2013.01)

(58) Field of Classification Search
CPC .... C02F 1/5272; C02F 1/001; C02F 2101/32; C02F 2101/34; C02F 2103/007
(Continued)

(56) References Cited

FOREIGN PATENT DOCUMENTS

WO WO 2020169595 A1 * 8/2020 ................ C02F 1/52

OTHER PUBLICATIONS

Peller et al. "Facile nanoplastics formation from macro and microplastics in aqueous media." Environmental Pollution. 2022, vol. 313, pp. 1-8.

(Continued)

*Primary Examiner* — In Suk C Bullock
(74) *Attorney, Agent, or Firm* — McDonnell Boehnen Hulbert & Berghoff LLP

(57) ABSTRACT

The present disclosure relates generally to a method comprising: providing an aqueous medium comprising at least one of microplastics and nanoplastics; combining an agglomerizer and the aqueous medium, wherein the agglomerizer has at least one $C_8$-$C_{32}$ hydrocarbon group; mixing the agglomerizer and aqueous medium to form at least one agglomerate of the at least one microplastics and nanoplastics having a $d_{50}$ particle size in the range of 1 to 100 mm; and separating the at least one agglomerate from the aqueous medium. The present disclosure also generally relates to a method comprising: providing an aqueous medium comprising at least one of microplastics and macroplastics; adding a solubilizer to the aqueous medium, wherein the solubilizer has at least one $C_6$-$C_{32}$ hydrocarbon group; and mixing the solubilizer and the aqueous medium to form a suspension of plastic particles, wherein the plastic particles in the suspension of plastic particles have a $d_{50}$ particle size in the range of 10 nm to 10 μm.

19 Claims, 12 Drawing Sheets

PE waste from a marsh in Hammond contaminated by a local company.

The mixture was transferred to a larger flask and 200 mL of marsh water was added, along with an additional 200 uL of dodecane. Within 15 minutes, the PE began aggregating.

After stirring overnight, larger agglomerates formed.

(51) Int. Cl.
  *C02F 101/32* (2006.01)
  *C02F 101/34* (2006.01)
  *C02F 103/00* (2006.01)

(58) Field of Classification Search
  USPC ......................................................... 210/730
  See application file for complete search history.

(56) References Cited

OTHER PUBLICATIONS

Ahmad et al. "Hydrophilic and hydrophobic materials and their applications." Energy Sources, Part A Recovery, Util. Environ. Eff. 2018, vol. 40, No. 22, pp. 2686-2725.

Akdogan et al. 2019. "Microplastics in the environment: a critical review of current understanding and identification of future research needs." Environ. Pollut. 2019, vol. 254. pp.

Alimi et al. "Microplastics and nanoplastics in aquatic environments: aggregation, deposition, and enhanced contaminant transport." Environ. Sci. Technol. 2018, vol. 52, No. 4, pp. 1704-1724.

Almeida et al. "Polystyrene nanoplastics alter the cytotoxicity of human pharmaceuticals on marine fish cell ines." Environ. Toxicol. Pharmacol. 2019, vol. 69, pp. 57-65.

Balakrishnan et al. "Towards more realistic reference microplastics and nanoplastics: preparation of polyethylene micro/nanoparticles with a biosurfactant." Environmental Science-NaNo. 2019, vol. 6, No. 1, pp. 315-324.

Benson et al."Micro(nano)plastics prevalence, food web interactions, and toxicity assessment in aquatic organisms: a review." Front. Mar. Sci. 2022, vol. 9, pp. 1-19.

Brown et al. Size-dependent proinflammatory effects of ultrafine polystyrene particles: a role for surface area and oxidative stress in the enhanced activity of ultrafines. Toxicol. Appl. Pharmacol. 2001, vol. 175, No. 3, pp. 191-199.

Cai, H.W. et al. "Separation and enrichment of nanoplastics in environmental water samples via ultracentrifugation." Water Res. 2021, vol. 203, pp. 1-10.

Cai, L. et al. "Effects of inorganic ions and natural organic matter on the aggregation of nanoplastics." Chemosphere. 2018, vol. 197, pp. 142-151.

Caldwell et al. "The micro-, submicron-, and nanoplastic hunt: a review of detection methods for plastic particles." Chemosphere. 2022, vol. 293, pp. 1-27.

Campanale et al. "A detailed review study on potential effects of microplastics and additives of concern on human health." Int. J. Environ. Res. Publ. Health. 2020, vol. 17, No. 4, pp. 1-26.

Cox et al. "Human consumption of microplastics." Environ. Sci. Technol. 2019, vol. 53, No. 12, pp. 7068-7074.

Dalton et al. "Extent and frequency of vessel oil spills in US marine protected areas." Mar. Pollut. Bull. 2010, vol. 60, No. 11, pp. 1939-1945.

Denayer et al. "Towards a predictive model for polymer solubility using the noncovalent interaction index: polyethylene as a case study." Phys. Chem. Chem. Phys. 2021, vol. 23, No. 44, p. 25374-25387.

Deville et al. "Intracellular dynamics and fate of polystyrene nanoparticles in A549 Lung epithelial cells monitored by mage (cross-) correlation spectroscopy and single particle tracking." Biochim. Biophys. Acta Mol. Cell Res. 2015, vol. 1853, No. 10, pp. 2411-2419.

Eales et al. "Human Health Impacts of Exposure to Phthalate Plasticizers: an Overview of Reviews." Environment International, 2022, vol. 158, pp. 1-19.

Fournier et al. "Microplastics in the human digestive environment: a focus on the potential and challenges facing in vitro gut model development." J. Hazard Mater. 2021, vol. 415, pp. 1-15.

Giacomo et al. "Plastics and microplastics in the oceans: from emerging pollutants to emerged threat." Mar. Environ. Res. 2017, vol. 128, pp. 2-11.

Gigault et al. "Current opinion: what is a nanoplastic?" Environ. Pollut. 2018, vol. 235, pp. 1030-1034.

Goncalves et al. "Nanoplastics impact on marine biota: a review." Environ. Pollut. 2021, vol. 273, pp. 1-33.

Hebner et al. "Characterizing microplastic size and morphology of photodegraded polymers placed in simulated moving water conditions." Environmental Science-Processes & Impacts. 2020, vol. 22, No. 2, pp. 398-407.

Hesler et al. "Multi-endpoint toxicological assessment of polystyrene nano- and microparticles in different biological models in vitro." Toxicology in Vitro, 2019, vol. 61, pp. 1-15.

Holloczki et al. "Can nanoplastics alter cell membranes?" ChemPhysChem. 2020, vol. 21, No. 1, pp. 9-12.

Ivleva. "Chemical analysis of microplastics and nanoplastics: challenges, advanced methods, and perspectives." Chem. Rev. 2021, vol. 121, No. 19, pp. 11886-11936.

Jiang et al. "Nanoparticle-mediated cellular response is size-dependent." Nat. Nanotechnol. 2008, vol. 3, No. 3, pp. 145-150.

Junaid et al. "Interaction of nanoplastics with extracellular polymeric substances (EPS) in the aquatic environment: a special reference to eco-corona formation and associated impacts." Water Res. 2021, vol. 201, pp. 1-18.

Kannan et al. "A review of human exposure to microplastics and insights into microplastics as obesogens." Front. Endocrinol. 2021, vol. 12, pp. 1-19.

Kutralam-Muniasamy et al. "A critical synthesis of current peer-reviewed literature on the environmental and human health impacts of COVID-19 Ppe litter: new findings and next steps." J. Hazard Mater. 2022, vol. 422, pp. 15.

Lal et al. "Nanoplastics and human health: hazard identification and biointerface." Nanomaterials. 2022, vol. 12, No. 8, op. 1-13.

Lehner et al. "Emergence of nanoplastic in the environment and possible impact on human health." Environ. Sci. Technol. 2019, vol. 53, No. 4, pp. 1748-1765.

Li, D. et al. "Microplastic release from the degradation of polypropylene feeding bottles during infant formula preparation." Nature Food. 2020, vol. 1, No. 11, pp. 746-754.

Li, Y. et al. "Separation and Identification of Nanoplastics in Tap Water." Environmental Research. 2022, vol. 204, pp. 1-8.

Lu, L. et al. "Interaction between microplastics and microorganism as well as gut microbiota: a consideration on environmental animal and human health." Sci. Total Environ. 2019, vol. 667, pp. 94-100.

Lu, Y.Y., et al. "Size-dependent effects of polystyrene nanoplastics on autophagy response in human umbilical vein endothelial cells." J. Hazard Mater. 2022, vol. 421, pp. 1-10.

Luo et al. "Aging of microplastics affects their surface properties, thermal decomposition, additives leaching and Interactions in simulated fluids." Sci. Total Environ. 2020, vol. 714, pp. 1-10.

Magri et al. "Laser ablation as a versatile tool to mimic polyethylene terephthalate nanoplastic pollutants: characterization and toxicology assessment." ACS NaNo. 2018, vol. 12, No. 8, pp. 7690-7700.

Mao et al. "Nanoplastics display strong stability in aqueous environments: insights from aggregation behaviour and theoretical calculations." Environ. Pollut. 2020, vol. 258. pp. 1-10.

Martin et al. "Materials, surfaces, and interfacial phenomena in nanoplastics toxicology research." Environ. Pollut. 2022, vol. 292, pp. 1-15.

Materic et al. "Micro- and nanoplastics in alpine snow: a new method for chemical identification and (Semi) Quantification in the nanogram range." Environ. Sci. Technol. 2020, vol. 54, No. 4, pp. 2353-2359.

Menzel et al. "Degradation of lowdensity polyethylene to nanoplastic particles by accelerated weathering." Sci. Total Environ. 2022, vol. 826, pp. 1-11.

Morgana et al. "Uncovering the release of micro/nanoplastics from disposable face masks at times of COVID-19." J. Hazard Mater. 2021, vol. 419, pp. 1-8.

Mortensen et al. "Unintended human ingestion of nanoplastics and small microplastics through drinking water, beverages, and food sources." Nanoimpact. 2021, vol. 21, pp. 1-21.

Nasser et al. "Secreted protein eco-corona mediates uptake and impacts of polystyrene nanoparticles on Daphnia magna." J. Proteonomics, 2016, vol. 137, pp. 45-51.

(56) References Cited

OTHER PUBLICATIONS

Oriekhova et al. "Heteroaggregation of nanoplastic particles in the presence of inorganic colloids and natural organic matter." Environmental Science-Nano, 2018, vol. 5, No. 3, pp. 792-799.

Peller et al. "The Reactivity of Polyethylene Microplastics in Water under Low Oxygen Conditions Using Radiation Chemistry." Water, 2021, vol. 13, No. 21, pp. 1-12.

Peller et al. "A review of microplastics in freshwater environments: locations, methods, and pollution loads. Contaminants in our water: identification and remediation methods." Am. Chem. Soc. 2020, vol. 1352, pp. 65-90.

Pessoni et al. "Soap- and metal-free polystyrene latex particles as a nanoplastic model." Environmental Science- Nano, 2019, vol. 6, No. 7, pp. 2253-2258.

Pikuda et al. "Toxicity assessments of micro- and nanoplastics can Be confounded by preservatives in commercial formulations." Environ. Sci. Technol. Lett. 2019, vol. 6, No. 1, pp. 21-25.

Prietl et al. "Nano-sized and micro-sized polystyrene particles affect phagocyte function." Cell Biol. Toxicol. 2014, vol. 30, No. 1, pp. 1-16.

Reynaud et al. "Nanoplastics: from model materials to colloidal fate." Curr. Opin. Colloid Interface Sci. 2022, vol. 57, op. 1-12.

Schirinzi et al. "Cytotoxic effects of commonly used nanomaterials and microplastics on cerebral and epithelial human cells." Environ. Res. 2017, vol. 159, pp. 579-587.

Schwaferts et al. "Methods for the analysis of submicrometer- and nanoplastic particles in the environment." Trac. Trends Anal. Chem. 2019, vol. 112, pp. 52-65.

Senathirajah et al. "Estimation of the mass of microplastics ingested—a pivotal first step towards human health risk assessment." J. Hazard Mater. 2021, vol. 404, pp. 1-15.

Shen et al. "Recent advances in toxicological research of nanoplastics in the environment: a review." Environ. Pollut. 2019, vol. 252, pp. 511-521.

Stock et al. "Microplastics and nanoplastics: size, surface and dispersant—what causes the effect?" Toxicology in Vitro, 2022, vol. 80., pp. 1-11.

Sun et al. "The difference of aggregation mechanism between microplastics and nanoplastics: role of Brownian motion and structural layer force." Environ. Pollut. 2021, vol. 268, pp. 1-11.

Von Der Esch et al. "Simple generation of suspensible secondary microplastic reference particles via ultrasound treatment." Front. Chem. 2020, vol. 8, No. 169, pp. 1-15.

Walczak et al. "Translocation of differently sized and charged polystyrene nanoparticles in in vitro intestinal cell models of increasing complexity." Nanotoxicology, 2015, vol. 9, No. 4, pp. 453-461.

Wang et al. "Advances in ultra-trace analytical capability for micro/nanoplastics and water-soluble polymers in the environment: fresh falling urban snow." Environ. Pollut. 2021, vol. 276, pp. 1-13.

Wright et al. "Plastic and human health: a micro issue?" Environ. Sci. Technol. 2017, vol. 51, No. 12, pp. 6634-6647.

Xu et al. "Identification and quantification of nanoplastics in surface waterand groundwater by pyrolysis gas chromatography—MassSpectrometry." Environ. Sci. Technol. 2022, vol. 56, No. 8, pp. 4988-4997.

Yin et al. "A comparative review of microplastics and nanoplastics: toxicity hazards on digestive, reproductive and nervous system." Sci. Total Environ. 2021, vol. 774, pp. 1-18.

Zangmeister et al. "Common single-use consumer plastic products release trillions ofSub-100 nm nanoparticles per iter into water during normal use." Environ. Sci. Technol. 2022, vol. 56, No. 9, pp. 5448-5455.

Zhang et al. "Improving nanoplastic removal by coagulation: impact mechanism of particle size and water chemical conditions." J. Hazard Mater. 2022, vol. 425, pp. 1-9.

Zhao et al. "Separation and characterization of microplastic and nanoplastic particles in marine environment." Environ. Pollut. 2022, vol. 297, pp. 1-12.

Zhou et al. "Key factors controlling transport of micro- and nanoplastic in porous media and its effect on coexisting pollutants." Environ. Pollut. 2022, vol. 293, pp. 1-9.

* cited by examiner

The mixture was transferred to a larger flask and 200 mL of marsh water was added, along with an additional 200 uL of dodecane. Within 15 minutes, the PE began aggregating.

After stirring overnight, larger agglomerates formed.

PE waste from a marsh in Hammond contaminated by a local company.

201

METHODS FOR THE FORMATION OF NANOPLASTICS AND THE AGGLOMERATION/REMOVAL OF MICRO- AND NANOPLASTICS IN WATER

1. FIELD

The present disclosure relates generally to methods for separating microplastics (MP) and/or nanoplastics (NP) from aqueous medium, methods of forming agglomerates and aqueous suspensions of plastic particles, and kits for determining a presence or concentration of microplastics and/or aqueous medium.

2. TECHNICAL BACKGROUND

The widespread production of plastic polymers, combined with their slow natural decomposition, have led to plastic waste contamination across the globe. Plastics-based pollution is a critical threat to the environment and likely to human health. Plastic polymers can be separated in two main categories: thermoplastics and thermosetting plastics. Thermoplastics include polyethylene (PE), polyethylene terephthalate (PET), and polypropylene (PP). Among these, polyethylene is one of the highest volume plastic materials manufactured and its excess as a waste is a major environmental concern. Polyethylene is highly resistant to natural breakdown mechanisms (i.e., decomposition), and considered insoluble in water.

Presently, polyethylene and other olefin-based plastic waste, including microplastics and nanoplastics, have been managed by mechanical and thermal-based treatments. For example, facilities that often term their processes "advanced recycling" convert polyethylene and other mostly olefin polymers to fuel via pyrolysis or other thermochemical processes. These types of thermal-based treatments usually require temperatures in the range of 400° C. to 600° C. or higher to revert polymers back to smaller molecules for fuel, which results in high economic and environmental costs. Since most plastic products contain additives, these thermal-based treatments could also potentially generate secondary pollutants. The structure of polyethylene and of other olefin polymers (e.g., polystyrene, polypropylene, and polyvinyl chloride) has so far precluded effective chemical transformations for reuse management (circular) of this waste where the materials can continuously be recycled.

However, small fragments of this plastic waste are increasingly found in a variety of water sources and other environments. Such fragments are characterized as microplastics and nanoplastics. Microplastics are small and fragmented plastics less than 5 mm in size. A separate classification known as nanoplastics has been adopted for plastic particles smaller than a micrometer. The sizes and shapes of MP and NP in the environment influence their uptake, adsorption, and impact on living organisms. While larger microplastic particles promote physical effects such as blockages in the digestive system, NP and smaller MP can cross biological membrane barriers and cause disruption to a number of biochemical pathways.

Studies on the effects of nanoplastics on humans indicate a range of potential disruptive biological processes. Therefore, accurate quantification of nanoplastics, based on aqueous-based standards, is critical for elucidating their effects. However, nanoplastics are difficult to isolate, detect, and study in aqueous media. Research studies on nanoplastics have been limited by the inability to effectively prepare NP in water, especially those formed from real world plastics, in a controlled manner.

Therefore, there is a need for a cost-effective and environmentally-friendly method for efficient management of thermoplastic waste, through novel removal and recycling processes. Additionally, there is a need to produce suspensions of such plastics (especially from real-world sources) in water.

SUMMARY

Currently disclosed is a method of separating microplastics (MP) and/or nanoplastics (NP) in aqueous medium using an agglomerizer. Also disclosed is a method for formation of suspensions of plastic particles in aqueous medium using a solubilizer that creates and enables the dispersion of nanoplastics and small microplastics. The presently disclosed methods involve the addition of a certain amount of agglomerizer or solubilizer to a specific amount of aqueous medium, wherein said aqueous medium contains plastic materials such as polyethylene (PE), polystyrene (PS), polypropylene (PP), polycarbonate (PC), polyamide (nylon), and polyethylene terephthalate (PET). Additionally, kits for determining the presence of microplastics and/or nanoplastics are disclosed.

Accordingly, in one aspect, the present disclosure provides for a method comprising:

providing an aqueous medium comprising at least one of microplastics and nanoplastics;

combining an agglomerizer and the aqueous medium, wherein the agglomerizer has at least one $C_8$-$C_{32}$ hydrocarbon group;

mixing the agglomerizer and aqueous medium to form at least one agglomerate of the at least one microplastics and nanoplastics, wherein the at least on agglomerate has a $d_{50}$ particle size in the range of 1 to 100 mm; and separating the at least one agglomerate from the aqueous medium.

In another aspect, the present disclosure provides for a method comprising:

providing an aqueous medium comprising at least one of microplastics, and macroplastics;

adding a solubilizer to the aqueous medium, wherein the solubilizer has at least one $C_6$-$C_{32}$ hydrocarbon group; and mixing the solubilizer and the aqueous medium to form a suspension of plastic particles, wherein the plastic particles in the suspension of plastic particles have a $d_{50}$ particle size in the range of 10 nm to 10 μm.

In another aspect, the present disclosure provides for a kit for determining a presence or concentration of microplastics and/or nanoplastics in an aqueous medium, the kit comprising:

a first container configured to contain an aqueous medium collected from a natural water source, a waste water source, or a municipal water source; and a second container comprising an agglomerizer, wherein the agglomerizer comprises a compound with at least one $C_8$-$C_{32}$ hydrocarbon group.

BRIEF DESCRIPTION OF FIGURES

The accompanying drawings are included to provide a further understanding of the methods and compositions of the disclosure, and are incorporated in and constitute a part of this specification. The drawings illustrate one or more embodiment(s) of the disclosure, and together with the description serve to explain the principles and operation of the disclosure.

DETAILED DESCRIPTION

Figure 1:
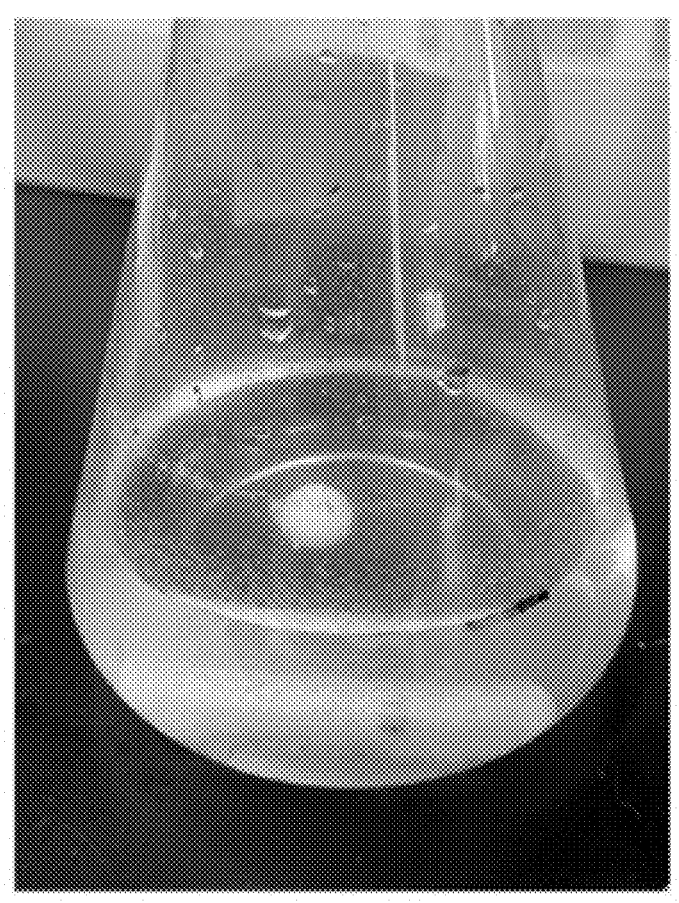
FIG. 1. is a picture of an agglomerate prepared by the method as described herein.

As discussed above, plastics-based pollution is a critical threat to the environment and human health. Plastic pollutant can be present in a variety of sources, and especially aqueous medium, in the form of nanoplastics, microplastics, or macroplastics. Currently, management of such plastic waste require energy intensive mechanical and thermal based treatment. Furthermore, such management is not always effective for the smaller plastic particles that may be present. Such small particles (e.g., nanoplastics and small microplastics) can cross biological membrane barriers and disrupts biochemical pathways. As such, there is a need in the art to provide simpler and easier removal and recycling processes of nanoplastics and microplastics. Further, there is a need to provide realistic nanoplastic and microplastic samples to researchers to better understand the effect of such particles on biological systems. To address these needs, the present inventors have found methods to from agglomerates and suspensions of plastic particles in aqueous medium. The present inventors have found that the agglomerates can be easily removed from aqueous medium, while the suspensions may provide controlled samples of real-world plastics that can be further studied.

Accordingly, the current disclosed method may be used to clean aqueous medium contaminated with micro/nanoplastic waste. Alternatively, or additionally, the currently disclosed method may be used to remove plastics from treated aqueous medium that are discharged into natural waters and/or used as drinking water. Thus, in one aspect, the present disclosure provides a method for separating microplastics from aqueous medium. The method includes providing an aqueous medium comprising at least one of microplastics and nanoplastics; combining a agglomerizer and the aqueous medium, wherein the agglomerizer has at least one $C_8$-$C_{32}$ hydrocarbon group; mixing the agglomerizer and aqueous medium to form at least one agglomerate of the at least one microplastics and nanoplastics, wherein the at least one agglomerate has a $d_{50}$ particle size in the range of 1 to 100 mm; and separating the at least one agglomerate from the aqueous medium.

As described above, the method may be used to clean aqueous medium contaminated with plastic waste. The source of the aqueous medium is not particularly. For example, the aqueous medium may originate from a natural water source, a waste water source, or a municipal water source. In some embodiments of the disclosure as described herein, the aqueous medium originates from a natural water source. The natural water source may be a fresh water source or a salt water source. For example, the natural water source may be selected from a pond, a river, a lake, or an ocean. In particular embodiments, the natural water source is a fresh water source. In some embodiments, the natural water source is selected from a pond, a river, or a lake. In some embodiments of the disclosure as described herein, the aqueous medium originates from a waste water source prior to use in the methods as described herein. For example, the waste water source originates from a water stream from industrial or manufacturing processes. The waste water stream may be treated or untreated for removal of plastics or other waste. In some embodiments of the disclosure as described herein, the aqueous medium originates from a municipal water source. For example, in some embodiments, the municipal water source is a tap water source.

As would be understood by the skilled person, the amount of microplastics and/or nanoplastics present in the aqueous medium is dependent on the source of the aqueous medium. As such, the amount of microplastics and nanoplastics in the aqueous medium is not particularly limited.

As described above, the aqueous medium may originate from a variety of sources. Based on the sources of the aqueous medium, other waste, impurities, or naturally occurring substances may be present in the aqueous medium. Thus, in some embodiments, the aqueous medium can further comprise other impurities. For example, the aqueous medium may include cellulosic materials, minerals, or other impurities. The skilled person would understand that the impurities depend on the source of the aqueous medium, and as such, the amount and identity of such impurities is not particularly limited.

The aqueous medium comprises at least one of microplastics and nanoplastics. As used herein, microplastics have a particle size (e.g., an average particle size) that is less than 5 mm. As used herein, nanoplastics have a particle size (e.g., an average particle size) that is less than 1 $\mu$m. In some embodiments, the aqueous medium comprises microplastics. In some embodiments, the aqueous medium comprises nanoplastics. In some embodiments, the aqueous medium comprises both microplastics and nanoplastics.

In some embodiments, when the aqueous medium comprises microplastics, the aqueous medium comprises microplastics having a $d_{50}$ particle size of no more than 5 mm. As used herein, the $d_{50}$ particle size is the median particle size, i.e., the size of the particle at which 50% of the particles are of larger particle size and 50% are of smaller particle size. As used herein, "particle size" is the largest dimension of the particle. In some embodiments as described herein, the microplastics have a $d_{50}$ particle size of no more than 3 mm. For example, in various embodiments, the microplastics have a $d_{50}$ particle size of no more than 2 mm, or 1.5 mm, or 1 mm. In various embodiments, the microplastics have a $d_{50}$ particle size in the range of 1 $\mu$m to 5 mm, or 1 $\mu$m to 3 mm, or 1 $\mu$m to 2 mm, or 1 $\mu$m to 1 mm. In various embodiments, the microplastics have a $d_{50}$ particle size in the range of 10 $\mu$m to 5 mm, or 10 $\mu$m to 3 mm, or 10 $\mu$m to 2 mm, or 10 $\mu$m to 1 mm. In various embodiments, the microplastics have a $d_{50}$ particle size in the range of 100 $\mu$m to 5 mm, or 100 $\mu$m to 3 mm, or 100 $\mu$m to 2 mm, or 100 $\mu$m to 1 mm.

As described above, in some embodiments, the aqueous medium comprises nanoplastics. In some embodiments, the aqueous medium comprises nanoplastics having a $d_{50}$ particle size of no more than 1 $\mu$m. In some embodiments as described herein, the nanoplastics have a $d_{50}$ particle size of no more than 0.5 $\mu$m. For example, in various embodiments, the nanoplastics have a $d_{50}$ particle size of no more than 0.2

$\mu$m, or 0.15 $\mu$m, or 0.1 $\mu$m. In various embodiments, the nanoplastics have a $d_{50}$ particle size in the range of 1 nm to 1 $\mu$m, or 1 nm to 0.5 $\mu$m, or 1 nm to 0.2 $\mu$m, or 1 nm to 0.1 $\mu$m. In various embodiments, the nanoplastics have a $d_{50}$ particle size in the range of 100 nm to 1 $\mu$m, or 100 nm to 0.5 $\mu$m, or 100 nm to 0.2 $\mu$m. In various embodiments, the nanoplastics have a $d_{50}$ particle size in the range of 200 nm to 1 $\mu$m, or 200 nm to 0.5 $\mu$m. In various embodiments, the nanoplastics have a $d_{50}$ particle size in the range of 500 nm to 1 $\mu$m, Microplastics and nanoplastics originate from plastic materials common to everyday life. As such, the microplastics and/or nanoplastics present in the aqueous medium are not particularly limited. In some embodiments, the microplastics are selected from polyester, polyethylene (PE), polystyrene (PS), polypropylene (PP), polycarbonate (PC), polyamide (e.g., nylon), polyethylene terephthalate (PET), poly(methylmethacrylate) (PMMA), or mixtures thereof. In some embodiments, the nanoplastics are selected from polyester, polyethylene (PE), polystyrene (PS), polypropylene (PP), polycarbonate (PC), polyamide (e.g., nylon), polyethylene terephthalate (PET), poly(methylmethacrylate) (PMMA), or mixtures thereof. In some embodiments, where both microplastics and nanoplastics are present in the aqueous medium, the microplastics and nanoplastics are individually selected from polyethylene (PE), polystyrene (PS), polypropylene (PP), polycarbonate (PC), polyamide (e.g., nylon), polyethylene terephthalate (PET), poly(methylmethacrylate) (PMMA), or mixtures thereof. In some embodiments, when the aqueous medium originates from a waste water source (e.g., a treated waste water source), the aqueous medium comprises microfibers (e.g., polyester).

The method as described herein includes combining an agglomerizer and the aqueous medium. In some embodiments as described above, the agglomerizer is combined with the aqueous medium in a ratio of at least 0.001:1 (e.g., at least 0.002:1, or 0.005:1, or 0.01:1) by volume. For example, in various embodiments as described herein, the agglomerizer is combined with the aqueous medium in a ratio in the range of 0.001:1 to 0.05:1, or 0.002:1 to 0.05:1, or 0.005:1 to 0.05:1, or 0.01:1 to 0.05:1, or 0.001:1 to 0.02:1, or 0.002:1 to 0.02:1, or 0.005:1 to 0.02:1, or 0.01:1 to 0.02:1, or 0.001:1 to 0.01:1, or 0.002:1 to 0.01:1, or 0.005:1 to 0.01:1 by volume.

The agglomerizer is selected from compounds that have oleaginous character. In various embodiments as described herein, the agglomerizer is a liquid. As described above, in some embodiments as disclosed herein, the agglomerizer has at least one $C_8$-$C_{32}$ hydrocarbon group. The hydrocarbon group may be a linear or branched hydrocarbon. For example, in various embodiments, the agglomerizer has at least one $C_8$-$C_{24}$ hydrocarbon group, or a $C_8$-$C_{20}$ hydrocarbon group, or a $C_8$-$C_{18}$ hydrocarbon group, or a $C_8$-$C_{16}$ hydrocarbon group, or a $C_8$-$C_{14}$ hydrocarbon group, or a $C_8$-$C_{12}$ hydrocarbon group. In some embodiments as disclosed herein, the agglomerizer has at least one $C_{10}$-$C_{32}$ hydrocarbon group. For example, in various embodiments, the agglomerizer has at least one $C_{10}$-$C_{24}$ hydrocarbon group, or a $C_{10}$-$C_{20}$ hydrocarbon group, or a $C_{10}$-$C_{18}$ hydrocarbon group, or a $C_{10}$-$C_{16}$ hydrocarbon group, or a $C_{10}$-$C_{14}$ hydrocarbon group, or a $C_{10}$-$C_{12}$ hydrocarbon group. In some embodiments, the agglomerizer has at least one $C_{12}$-$C_{32}$ hydrocarbon group. For example, in various embodiments, the agglomerizer has at least one $C_{12}$-$C_{24}$ hydrocarbon group, or a $C_{12}$-$C_{20}$ hydrocarbon group, or a $C_{12}$-$C_{18}$ hydrocarbon group, or a $C_{12}$-$C_{16}$ hydrocarbon group, or a $C_{12}$-$C_{14}$ hydrocarbon group.

In some embodiments as described herein, the $C_8$-$C_{32}$ hydrocarbon group may be substituted or unsubstituted. For example, the hydrocarbon group may be substituted with functional groups. Such functional groups may include halide atoms (e.g., fluorine, chlorine, or bromine), oxygen atoms (e.g., hydroxyl, carboxyl, alkoxy, carbonyl), nitrogen atoms (e.g., amino, cyano, imine), or sulfur atoms (e.g., thiols, sulfoxide, sulfate) or combinations thereof (e.g., nitro). In some embodiments, the $C_8$-$C_{32}$ hydrocarbon group is selected from a $C_8$-$C_{32}$ alkyl, a $C_8$-$C_{32}$ alkenyl, a $C_8$-$C_{32}$ alkynyl, a $C_8$-$C_{32}$ alkoxy, a $C_8$-$C_{32}$ alcohol, a $C_8$-$C_{32}$ ether, a $C_8$-$C_{32}$ carboxylic acid, a $C_8$-$C_{32}$ aldehyde, or a $C_8$-$C_{32}$ ketone. In some embodiments, the $C_8$-$C_{32}$ hydrocarbon group is selected from a $C_8$-$C_{32}$ alkyl, a $C_8$-$C_{32}$ alkenyl, a $C_8$-$C_{32}$ alcohol, a $C_8$-$C_{32}$ carboxylic acid, or a $C_8$-$C_{32}$ ketone.

In various embodiments, the $C_8$-$C_{32}$ hydrocarbon group is selected from a $C_8$-$C_{32}$ alkyl, or a $C_8$-$C_{24}$ alkyl group, a $C_8$-$C_{20}$ alkyl group, or a $C_8$-$C_{18}$ alkyl group, or a $C_8$-$C_{16}$ alkyl group, or a $C_8$-$C_{14}$ alkyl group, or a $C_8$-$C_{12}$ alkyl group. In various embodiments, the $C_8$-$C_{32}$ hydrocarbon group is selected from a $C_8$-$C_{32}$ alkenyl, or a $C_8$-$C_{24}$ alkenyl group, a $C_8$-$C_{20}$ alkenyl group, or a $C_8$-$C_{18}$ alkenyl group, or a $C_8$-$C_{16}$ alkenyl group, or a $C_8$-$C_{14}$ alkenyl group, or a $C_8$-$C_{12}$ alkenyl group. In various embodiments, the $C_8$-$C_{32}$ hydrocarbon group is selected from a $C_8$-$C_{32}$ alcohol, or a $C_8$-$C_{24}$ alcohol, a $C_8$-$C_{20}$ alcohol, or a $C_8$-$C_{18}$ alcohol, or a $C_8$-$C_{16}$ alcohol, or a $C_8$-$C_{14}$ alcohol, or a $C_8$-$C_{12}$ alcohol. In various embodiments, the $C_8$-$C_{32}$ hydrocarbon group is selected from a $C_8$-$C_{32}$ carboxylic acid, or a $C_8$-$C_{24}$ carboxylic acid, a $C_8$-$C_{20}$ carboxylic acid, or a $C_8$-$C_{18}$ carboxylic acid, or a $C_8$-$C_{16}$ carboxylic acid, or a $C_8$-$C_{14}$ carboxylic acid, or a $C_8$-$C_{12}$ carboxylic acid. In various embodiments, the $C_8$-$C_{32}$ hydrocarbon group is selected from a $C_8$-$C_{32}$ ketone, or a $C_8$-$C_{24}$ ketone, a $C_8$-$C_{20}$ ketone, or a $C_8$-$C_{18}$ ketone, or a $C_8$-$C_{16}$ ketone, or a $C_8$-$C_{14}$ ketone, or a $C_8$-$C_{12}$ ketone.

In some embodiments as described herein, the agglomerizer is selected from a linear or branched alkane. For example, in various embodiments, the agglomerizer is selected from a alkane comprising 8 to 32 carbons, or 8 to 24 carbons, or 8 to 20 carbons, or 8 to 18 carbons, or 8 to 16 carbons, or 8 to 14 carbons, or 8 to 12 carbons. In some embodiments, the agglomerizer is a linear alkane. In some embodiments, the agglomerizer is selected from octane, nonane, decane, undecane, dodecane, tridecane, tetradecane, hexadecane, octadecane, or mixtures thereof. In some embodiments, the agglomerizer is dodecane. In some embodiments, the agglomerizer is tetradecane.

In some embodiments as described herein, the agglomerizer is selected from a linear or branched alkene. For example, in various embodiments, the agglomerizer is selected from a alkene comprising 8 to 32 carbons, or 8 to 24 carbons, or 8 to 20 carbons, or 8 to 18 carbons, or 8 to 16 carbons, or 8 to 14 carbons, or 8 to 12 carbons. In some embodiments, the agglomerizer is a linear alkene. In some embodiments, the agglomerizer is selected from octene, nonene, decene, undecene, dodecene, tridecene, tetradecene, hexadecane, octadecene, or mixtures thereof. In some embodiments as described herein, the agglomerizer is kerosene.

In some embodiments as described herein, the agglomerizer is selected from a linear or branched alcohol. For example, in various embodiments, the agglomerizer is selected from a alcohol comprising 8 to 32 carbons, or 8 to 24 carbons, or 8 to 20 carbons, or 8 to 18 carbons, or 8 to 16 carbons, or 8 to 14 carbons, or 8 to 12 carbons. In some embodiments, the agglomerizer is a linear alcohol. In some embodiments, the agglomerizer is selected from octanol, nonanol, decanol, undecanol, dodecanol, tridecanol, tetradecanol, hexadecanol, octadecanol, or mixtures thereof.

In some embodiments as described herein, the agglomerizer is selected from a linear or branched ketone. For example, in various embodiments, the agglomerizer is selected from a ketone comprising 8 to 32 carbons, or 8 to 24 carbons, or 8 to 20 carbons, or 8 to 18 carbons, or 8 to 16 carbons, or 8 to 14 carbons, or 8 to 12 carbons. In some embodiments, the agglomerizer is a linear ketone. In some embodiments, the agglomerizer is selected from 2-octanone, 2-nonanone, 2-decanone, 2-undecanone, 2-dodecanone, 2-tridecanone, 2-tetradecanone, 2-hexadecanone, 2-octadecanone, or mixtures thereof.

As described above, the method includes mixing the agglomerizer and the aqueous medium. The method of mixing is not particularly limited, as long as the mixing is down in a manner to pull particles together. For example, in some embodiments, mixing the agglomerizer and aqueous medium is conducted by vortex mixing. In some embodiments, mixing the agglomerizer and aqueous medium is conducted for a time in the range of 1 minute to 5 hours (e.g., in the range of 15 minutes to 5 hours, 30 minutes to 5 hours, 1 hour to 5 hours, 1 minute to 3 hours, 15 minutes to 3 hours, 30 minutes to 3 hours, 1 hour to 3 hours, 1 minute to 2 hours, 15 minutes to 2 hours, 30 minutes to 2 hours, or 1 hour to 2 hours). In some embodiments, mixing the agglomerizer and aqueous medium is conducted at a temperature in the range of 15-35° C. (e.g., in the range of 15-30° C., or 15-25° C., or 20-35° C., or 20-30° C., or 20-25° C.). In some embodiments, mixing the solubilizer and aqueous medium is conducted at room temperature (e.g., 20-22° C.).

As described above, mixing the agglomerizer and the aqueous medium forms at least one agglomerate of the microplastics having a $d_{50}$ particle size in the range of 1 to 100 mm. As would be understood by the skilled person, the particle size of the agglomerate is dependent on the volume of aqueous medium and the amount of microplastics or nanoplastics present in the aqueous medium. However, the present disclosure describes providing a volume of aqueous medium sufficient to make agglomerates that are larger than the microplastics and/or nanoplastics originally present in the aqueous medium. In doing so, the agglomerate can be easily separated from the aqueous medium. In various embodiments, the at least one agglomerate has a $d_{50}$ particle size in the range of 1 to 75 mm, or 1 to 50 mm, or 1 to 25 mm, or 1 to 10 mm, or 1 to 5 mm. In various embodiments, the at least one agglomerate has a $d_{50}$ particle size in the range of 2 to 100 mm, or 2 to 75 mm, or 2 to 50 mm, or 2 to 25 mm, or 2 to 10 mm, or 2 to 5 mm. In various embodiments, the at least one agglomerate has a $d_{50}$ particle size in the range of 3 to 100 mm, or 3 to 75 mm, or 3 to 50 mm, or 3 to 25 mm, or 3 to 10 mm, or 3 to 5 mm. In various embodiments, the at least one agglomerate has a $d_{50}$ particle size in the range of 5 to 100 mm, or 5 to 75 mm, or 5 to 50 mm, or 5 to 25 mm, or 5 to 10 mm. In various embodiments, the at least one agglomerate has a $d_{50}$ particle size in the range of 10 to 100 mm, or 10 to 75 mm, or 10 to 50 mm, or 10 to 25 mm.

In various embodiments, the at least one agglomerate comprises plastic and the agglomerizer. Unsuspectedly, the method provides agglomerates that are mostly plastic. In some embodiments as described herein, the at least one agglomerate comprises at least 80 wt % plastic, by weight of the agglomerate. For example, in various embodiments, the at least one agglomerate comprises at least 85 wt %, or 90 wt %, or 95 wt % plastic, by weight of the agglomerate. Other impurities (e.g., cellulosic materials or minerals) are not present in the agglomerates in any substantial amount. In various embodiments, the agglomerate comprises no more than 10%, or 5%, or 2% of other impurities (e.g., cellulosic material or minerals). As described above, the agglomerate is formed of the microplastics and/or nanoplastics present in the aqueous medium. As such, in various embodiments, the plastic is selected from polyester, polyethylene (PE), polystyrene (PS), polypropylene (PP), polycarbonate (PC), polyamide (e.g., nylon), polyethylene terephthalate (PET), poly(methyl methacrylate) (PMMA), or mixtures thereof.

In some embodiments as described herein, the method includes separating the at least one agglomerate from the aqueous medium. For example, the separating may include centrifugation, filtering, decanting, or combinations thereof. An appropriate method may be selected based on the size of the agglomerates. In some embodiments, the separating the at least one agglomerate from the aqueous medium comprises filtering the at least one agglomerate in the aqueous mixture. A filter with an appropriate pore size may be selected based on the size of the agglomerate. In some embodiments, the filtering uses a filter with a pore size of no more than 1 mm (e.g., no more than 0.5 mm, 0.2 mm, or 0.1 mm). For example, in various embodiments, the filtering uses a filter with a pore size in the range of 0.1 to 1 mm (e.g., in the range of 0.5 to 1 mm, or 0.1 to 1 mm).

In some embodiments as described herein, the method further comprises recycling the at least one agglomerate. For example, in some embodiments, the separated agglomerates are provided to a plastics recycling facilities or plastic manufacturers for further use and transformation into plastic objects.

In some embodiments as described herein, the method provides at least 50% recovery of the microplastics and/or nanoplastics as at least one agglomerate. For example, in various embodiments, the method provides at least 75%, or 80%, or 85%, or 90%, or 95% recovery of the microplastics and/or nanoplastics as at least one agglomerate Another aspect of the present disclosure provides a method for forming suspensions of plastic particles. The present inventors have found that certain solubilizing compounds, including scission products from polymer degradation, can solubilize plastic pieces to form microplastics and nanoplastics sized particulates that readily suspend in water. Without being bound by theory, the present hypothesis is that this formation mechanism, which can form tailored size distributions of plastic particles, is different from other reported studies of nanoplastic formation, which are created by mechanical fragmentation or via special synthetic methods to form specific nanoplastics. The present disclosure notes the ease of nanoplastic formation in water via the paraffinic/shaking mechanism, which suggests that nanoplastic may be present in many natural aqueous systems, much more than previously considered, and may be part of the unaccounted waste plastic in surface waters. Additionally, the present inventors note that the ease of suspension formation suggests that NP have been contaminating biological systems since the conception of plastics. The currently disclosed method for the suspension of plastic materials with a solubilizer in aqueous medium provides a means for the recycling or upcycling of many plastic materials since dissolution or suspension in water enables further chemical and physical transformations. Further, the currently disclosed method provides a simple and reliable method for creating suspensions of plastic particles in water from real-world plastics (plastics products in use and found in the environment) for scientific studies of their properties and interactions. This property may be a means for separating plastics from other non-solubilizing materials for improved waste management. Accordingly, the method includes providing an aqueous medium comprising at least one of microplastics and macroplastics; adding a solubilizer to the aqueous medium, wherein the solubilizer has at least one $C_8$-$C_{32}$ hydrocarbon group; and mixing the solubilizer and the aqueous medium to form a suspension of plastic particles, wherein plastic particles in the suspension have a $d_{50}$ particle size in the range of 10 nm to 10 μm.

As described above, it can be advantageous for the suspension of plastic particles be made from real-world plastic materials. The method includes providing an aqueous medium comprising at least one of microplastics and macroplastics. In some embodiments as described herein, providing the aqueous medium comprising at least one of microplastics and macroplastics comprises adding at least one of microplastics and macroplastics to an aqueous medium. The aqueous medium is not particularly limited. For example, in some embodiments, the aqueous medium may be DI water. The at least one microplastics and macroplastics is not particularly limited. In some embodiments as described herein, the at least one microplastics and macroplastics originate for commercial sources. In some embodiments as described herein, the at least one microplastics and macroplastics originate from real-world plastic materials. For example, in some embodiments as described herein, the at least one microplastics and macroplastics are formed from larger plastic material (e.g., by grating, chopping, shaving, or dissolving a larger plastic material), The amount of microplastics and macroplastics in the aqueous medium is not particularly limited. In some embodiments as described herein, the ratio of the least one of microplastic and macroplastics to the aqueous medium is at least 1:10,000 by weight, or 1:5,000 by weight, or 1:4,000 by weight, or 1:3,500 by weight. In some embodiments as described herein, the ratio of the at least one or microplastics and macroplastics to the aqueous medium is in the range of 1:10,000 to 1:500 by weight, or 1:10,000 to 1:1,000 by weight, or 1:10,000 to 1:2,000 by weight, or 1:5,000 to 1:500 by weight, or 1:5,000 to 1:1,000 by weight, or 1:5,000 to 1:2,000 by weight, or 1:4,000 to 1:500 by weight, or 1:4,000 to 1:1000 by weight, or 1:4,000 to 1:2,000 by weight.

As described above, the aqueous medium comprises at least one of microplastics and macroplastics. In some embodiments, the aqueous medium comprises microplastics. In some embodiments, the aqueous medium comprises macroplastics. In some embodiments as described herein, the aqueous medium comprises both microplastics and macroplastics. As used herein, macroplastics have a particle size (e.g., an average particle) greater than 5 mm.

When the aqueous medium comprises microplastics, in some embodiments, the microplastics have a $d_{50}$ particle size of no more than 5 mm. For example, in various embodiments, the microplastics have a $d_{50}$ particle size of no more than 3 mm, 2 mm, 1.5 mm, or 1 mm. In various embodiments, the microplastics have a $d_{50}$ particle size in the range of 1 μm to 5 mm, or 1 μm to 3 mm, or 1 μm to 2 mm, or 1 μm to 1 mm. In various embodiments, the microplastics have a $d_{50}$ particle size in the range of 10 μm to 5 mm, or 10 μm to 3 mm, or 10 μm to 2 mm, or 10 μm to 1 mm. In various embodiments, the microplastics have a $d_{50}$ particle size in the range of 100 μm to 5 mm, or 100 μm to 3 mm, or 100 μm to 2 mm, or 100 μm to 1 mm.

When the aqueous medium comprises macroplastics, in various embodiments, the macroplastics have a $d_{50}$ particle size of at least 5 mm. For example, in various embodiments, the macroplastics have a $d_{50}$ of at least 7 mm, or 10 mm, or 15 mm. In various embodiments, the macroplastics have a $d_{50}$ particle size in the range of 5 mm to 100 mm, or 5 mm to 75 mm, or 5 mm to 50 mm, or 5 mm to 25 mm. In various embodiments, the macroplastics have a $d_{50}$ particle size in the range of 7 mm to 100 mm, or 7 mm to 75 mm, or 7 mm to 50 mm, or 7 mm to 25 mm. In various embodiments, the macroplastics have a $d_{50}$ particle size in the range of 10 mm to 100 mm, or 10 mm to 75 mm, or 10 mm to 50 mm, or 10 mm to 25 mm. In various embodiments, the macroplastics have a $d_{50}$ particle size in the range of 15 mm to 100 mm, or 15 mm to 75 mm, or 15 mm to 50 mm, or 15 mm to 25 mm.

Microplastics and macroplastics are derived from plastic materials common to everyday life. As such, the microplastics and macroplastics present in the aqueous medium are not particularly limited. In some embodiments, the microplastics are selected from polyester, polyethylene (PE), polystyrene (PS), polypropylene (PP), polycarbonate (PC), polyamide (e.g., nylon), polyethylene terephthalate (PET), poly(methylmethacrylate) (PMMA), or mixtures thereof. In some embodiments, the macroplastics are selected from polyester, polyethylene (PE), polystyrene (PS), polypropylene (PP), polycarbonate (PC), polyamide (e.g., nylon), polyethylene terephthalate (PET), poly(methylmethacrylate) (PMMA), or mixtures thereof. When microplastics and macroplastics are present in the aqueous medium, in some embodiments, the microplastics and macroplastics are individually selected from polyester, polyethylene (PE), polystyrene (PS), polypropylene (PP), polycarbonate (PC), polyamide (e.g., nylon), polyethylene terephthalate (PET), poly(methylmethacrylate) (PMMA), or mixtures thereof. In some embodiments, the macroplastics are selected from polyester, polyethylene (PE), polystyrene (PS), polypropylene (PP), polycarbonate (PC), polyamide (e.g., nylon), polyethylene terephthalate (PET), poly(methylmethacrylate) (PMMA), or mixtures thereof.

As described above, the method includes combining a solubilizer and the aqueous medium. In some embodiments as described above, the solubilizer is combined with the aqueous medium in a ratio of at least 0.001:1 (e.g., at least 0.002:1, or 0.005:1, or 0.01:1) by volume. For example, in various embodiments as described herein, the solubilizer is combined with the aqueous medium in a ratio in the range of 0.001:1 to 0.05:1, or 0.002:1 to 0.05:1, or 0.005:1 to 0.05:1, or 0.01:1 to 0.05:1, or 0.001:1 to 0.02:1, or 0.002:1 to 0.02:1, or 0.005:1 to 0.02:1, or 0.01:1 to 0.02:1, or 0.001:1 to 0.01:1, or 0.002:1 to 0.01:1, or 0.005:1 to 0.01:1 by volume.

The solubilizer is selected from compounds that have oleaginous character. In various embodiments as described herein, the solubilizer is a liquid. As such, in some embodiments as disclosed herein, the solubilizer has at least one $C_6$-$C_{32}$ hydrocarbon group. The hydrocarbon group may be a linear, branched, or cyclic hydrocarbon. For example, in various embodiments, the solubilizer has at least one $C_6$-$C_{24}$ hydrocarbon group, or a $C_6$-$C_{20}$ hydrocarbon group, or a $C_6$-$C_{18}$ hydrocarbon group, or a $C_6$-$C_{16}$ hydrocarbon group, or a $C_6$-$C_{14}$ hydrocarbon group, or a $C_6$-$C_{12}$ hydrocarbon group. For example, in various embodiments, the solubilizer has at least one $C_8$-$C_{24}$ hydrocarbon group, or a $C_8$-$C_{20}$ hydrocarbon group, or a $C_8$-$C_{18}$ hydrocarbon group, or a $C_8$-$C_{16}$ hydrocarbon group, or a $C_8$-$C_{14}$ hydrocarbon group, or a $C_8$-$C_{12}$ hydrocarbon group. In some embodiments as disclosed herein, the solubilizer has at least one $C_{10}$-$C_{32}$ hydrocarbon group. For example, in various embodiments, the solubilizer has at least one $C_{10}$-$C_{24}$ hydrocarbon group, or a $C_{10}$-$C_{20}$ hydrocarbon group, or a $C_{10}$-$C_{18}$ hydrocarbon group, or a $C_{10}$-$C_{16}$ hydrocarbon group, or a $C_{10}$-$C_{14}$ hydrocarbon group, or a $C_{10}$-$C_{12}$ hydrocarbon group. In some embodiments, the solubilizer has at least one $C_{12}$-$C_{32}$ hydrocarbon group. For example, in various embodiments, the solubilizer has at least one $C_{12}$-$C_{24}$ hydrocarbon group, or a $C_{12}$-$C_{20}$ hydrocarbon group, or a $C_{12}$-$C_{18}$ hydrocarbon group, or a $C_{12}$-$C_{16}$ hydrocarbon group, or a $C_{12}$-$C_{14}$ hydrocarbon group.

In some embodiments as described herein, the $C_6$-$C_{32}$ hydrocarbon group may be substituted or unsubstituted. For example, the hydrocarbon group may be substituted with functional groups. Such functional groups may include halide atoms (e.g., fluorine, chlorine, or bromine), oxygen atoms (e.g., hydroxyl, carboxyl, alkoxy, carbonyl), nitrogen atoms (e.g., amino, cyano, imine), or sulfur atoms (e.g., thiols, sulfoxide, sulfate) or combinations thereof (e.g., nitro). In some embodiments, the $C_6$-$C_{32}$ hydrocarbon group is selected from a $C_6$-$C_{32}$ alkyl, a $C_6$-$C_{32}$ alkenyl, a $C_6$-$C_{32}$ alkynyl, a $C_6$-$C_{32}$ alkoxy, a $C_6$-$C_{32}$ alcohol, a $C_6$-$C_{32}$ ether, a $C_6$-$C_{32}$ carboxylic acid, a $C_6$-$C_{32}$ aldehyde, or a $C_6$-$C_{32}$ ketone. In some embodiments, the $C_6$-$C_{32}$ hydrocarbon group is selected from a $C_6$-$C_{32}$ alkyl, a $C_6$-$C_{32}$ alkenyl, a $C_6$-$C_{32}$ alcohol, a $C_6$-$C_{32}$ carboxylic acid, or a $C_6$-$C_{32}$ ketone.

In various embodiments, the $C_6$-$C_{32}$ hydrocarbon group is selected from a $C_6$-$C_{32}$ alkyl, or a $C_6$-$C_{24}$ alkyl group, a $C_6$-$C_{20}$ alkyl group, or a $C_6$-$C_{18}$ alkyl group, or a $C_6$-$C_{16}$ alkyl group, or a $C_6$-$C_{14}$ alkyl group, or a $C_6$-$C_{12}$ alkyl group. In various embodiments, the $C_6$-$C_{32}$ hydrocarbon group is selected from a $C_6$-$C_{32}$ alkenyl, or a $C_6$-$C_{24}$ alkenyl group, a $C_6$-$C_{20}$ alkenyl group, or a $C_6$-$C_{18}$ alkenyl group, or a $C_6$-$C_{16}$ alkenyl group, or a $C_6$-$C_{14}$ alkenyl group, or a $C_6$-$C_{12}$ alkenyl group. In various embodiments, the $C_6$-$C_{32}$ hydrocarbon group is selected from a $C_6$-$C_{32}$ alcohol, or a $C_6$-$C_{24}$ alcohol, a $C_6$-$C_{20}$ alcohol, or a $C_6$-$C_{18}$ alcohol, or a $C_6$-$C_{16}$ alcohol, or a $C_6$-$C_{14}$ alcohol, or a $C_6$-$C_{12}$ alcohol. In various embodiments, the $C_6$-$C_{32}$ hydrocarbon group is selected from a $C_6$-$C_{32}$ carboxylic acid, or a $C_6$-$C_{24}$ carboxylic acid, a $C_6$-$C_{20}$ carboxylic acid, or a $C_6$-$C_{18}$ carboxylic acid, or a $C_6$-$C_{16}$ carboxylic acid, or a $C_6$-$C_{14}$ carboxylic acid, or a $C_6$-$C_{12}$ carboxylic acid. In various embodiments, the $C_6$-$C_{32}$ hydrocarbon group is selected from a $C_6$-$C_{32}$ ketone, or a $C_6$-$C_{24}$ ketone, a $C_6$-$C_{20}$ ketone, or a $C_6$-$C_{18}$ ketone, or a $C_6$-$C_{16}$ ketone, or a $C_6$-$C_{14}$ ketone, or a $C_6$-$C_{12}$ ketone.

In some embodiments as described herein, the solubilizer is selected from a linear, branched, or cyclic alkane. For example, in various embodiments, the solubilizer is selected from a alkane comprising 6 to 32 carbons, or 6 to 24 carbons, or 6 to 20 carbons, or 6 to 18 carbon, or 6 to 16 carbons, or 6 to 14 carbons, or 6 to 12 carbons. In some embodiments, the solubilizer is a linear alkane. In some embodiments, the solubilizer is selected from octane, nonane, decane, undecane, dodecane, tridecane, tetradecane, hexadecane, octadecane, or mixtures thereof. In some embodiments, the solubilizer is dodecane. In some embodiments, the solubilizer is tetradecane. In some embodiments, the solubilizer is a cyclic alkane. In some embodiments, the solubilizer is selected from cyclohexane, cycloheptane, or cyclooctane.

In some embodiments as described herein, the solubilizer is selected from a linear, branched, or cyclic alkene. For example, in various embodiments, the solubilizer is selected from an alkene comprising 6 to 32 carbons, or 6 to 24 carbons, or 6 to 20 carbons, or 6 to 18 carbon, or 6 to 16 carbons, or 6 to 14 carbons, or 6 to 12 carbons. In some embodiments, the solubilizer is a linear alkene. In some embodiments, the solubilizer is selected from octene, nonene, decene, undecene, dodecene, tridecene, tetradecene, hexadecane, octadecene, or mixtures thereof. In some embodiments as described herein, the solubilizer is kerosene. In some embodiments, the solubilizer is a cyclic alkene. In some embodiments, the solubilizer is a cyclic aromatic alkene. In some embodiments, the solubilizer is selected from benzene, toluene, or xylene.

In some embodiments as described herein, the solubilizer is selected from a linear, branched, or cyclic alcohol. For example, in various embodiments, the solubilizer is selected from a alcohol comprising 6 to 32 carbons, or 6 to 24 carbons, or 6 to 20 carbons, or 6 to 18 carbon, or 6 to 16 carbons, or 6 to 14 carbons, or 6 to 12 carbons. In some embodiments, the solubilizer is a linear alcohol. In some embodiments, the solubilizer is selected from octanol, nonanol, decanol, undecanol, dodecanol, tridecanol, tetradecanol, hexadecanol, octadecanol, or mixtures thereof. In some embodiments, the solubilizer is a cyclic alcohol (e.g., phenol).

In some embodiments as described herein, the solubilizer is selected from a linear, branched, or cyclic ketone. For example, in various embodiments, the solubilizer is selected from a ketone comprising 6 to 32 carbons, or 6 to 24 carbons, or 6 to 20 carbons, or 6 to 18 carbon, or 6 to 16 carbons, or 6 to 14 carbons, or 6 to 12 carbons. In some embodiments, the solubilizer is a linear ketone. In some embodiments, the solubilizer is selected from 2-octanonone, 2-nonanone, 2-decanone, 2-undecanone, 2-dodecanone, 2-tridecanone, 2-tetradecanone, 2-hexadecanone, 2-octadecanone, or mixtures thereof. In some embodiments, the solubilizer is a cyclic ketone.

In some embodiments as described herein, the solubilizer is selected from a saturated fatty acid, an unsaturated fatty acid, or mixtures thereof. In some embodiments, the solubilizer is selected from a $C_8$-$C_{32}$ saturated fatty acid, or a $C_8$-$C_{24}$ saturated fatty acid, a $C_8$-$C_{20}$ saturated fatty acid, or a $C_8$-$C_{18}$ saturated fatty acid, or a $C_8$-$C_{16}$ saturated fatty acid, or a $C_8$-$C_{14}$ saturated fatty acid, or a $C_8$-$C_{12}$ saturated fatty acid. In some embodiments, the solubilizer is selected from a $C_8$-$C_{32}$ unsaturated fatty acid, or a $C_8$-$C_{24}$ unsaturated fatty acid, a $C_8$-$C_{20}$ unsaturated fatty acid, or a $C_8$-$C_{18}$ unsaturated fatty acid, or a $C_8$-$C_{16}$ unsaturated fatty acid, or a $C_8$-$C_{14}$ unsaturated fatty acid, or a $C_8$-$C_{12}$ unsaturated fatty acid. In some embodiments as described herein, the saturated fatty acid and/or unsaturated fatty acid comprises 8 to 32 carbons, or 8 to 24 carbons, or 8 to 20 carbons, or 8 to 18 carbons, or 8 to 16 carbons, or 8 to 14 carbons, or 8 to 12 carbons. For example, in some embodiments, the solubilizer is selected from palmitic acid, stearic acid, oleic acid, linoleic acid, or linolenic acid. In some embodiments, the solubilizer is vegetable oil. In some embodiments the solubilizer is a triglyceride (e.g., unsaturated or saturated).

In some embodiments as described herein, the solubilizer is selected from a nonionic surfactant, an anionic surfactant, or a cationic surfactant. For example, in some embodiments, the solubilizer is selected from sodium lauryl sulfate, sodium laureth sulfate, sodium stearate, quaternary ammonium salts (e.g., cetrimonium bromide, benzalkonium chloride), or fatty acid ethoxylates.

As described above, the method includes mixing the solubilizer and the aqueous medium. The method of mixing is not particularly limited. For example, in some embodiments, mixing the solubilizer and aqueous medium is conducted by mechanical mixing (e.g., high speed mixing of low speed mixing), flow mixing, static mixing, or sonication. In some embodiments, mixing the solubilizer and aqueous medium is conducted for a time in the range of 1 to 60 minutes (e.g., in the range of 5 to 60 minutes, or 5 to 45 minutes, or 5 to 30 minutes, or 10 to 60 minutes, or 10 to 45 minutes, or 10 to 30 minutes). In some embodiments, mixing the solubilizer and aqueous medium is conducted at a temperature in the range of 15-35° C. (e.g., in the range of 15-30° C., or 15-25° C., or 20-35° C., or 20-30° C., or 20-25° C.). In some embodiments, mixing the solubilizer and aqueous medium is conducted at room temperature (e.g., 20-22° C.).

As described above, mixing the solubilizer and the aqueous medium forms a suspension of plastic particles, wherein the plastic particles in the suspension have a $d_{50}$ particle size in the range of 10 nm to 10 μm. In various embodiments, the plastic particles have a $d_{50}$ particle size in the range of 10 nm to 8 μm, or 10 nm to 6 μm, or 10 nm to 4 μm, or 10 nm to 2 μm. In various embodiments, the plastic particles have a $d_{50}$ particle size in the range of 50 nm to 8 μm, or 50 nm to 6 μm, or 50 nm to 4 μm, or 50 nm to 2 μm. In various embodiments, the plastic particles have a $d_{50}$ particle size in the range of 100 nm to 8 μm, or 100 nm to 6 μm, or 100 nm to 4 μm, or 100 nm to 2 μm. In various embodiments, the plastic particles have a $d_{50}$ particle size in the range of 150 nm to 10 μm, or 150 nm to 8 μm, or 150 nm to 6 μm, or 100 nm to 4 μm, or 150 nm to 2 μm. In various embodiments, the plastic particles have a $d_{50}$ particle size in the range of 200 nm to 10 μm, or 200 nm to 8 μm, or 200 nm to 6 μm, or 200 nm to 4 μm, or 200 nm to 2 μm. In various embodiments, the plastic particles have a $d_{50}$ particle size in the range of 500 nm to 10 μm, or 500 nm to 8 μm, or 500 nm to 6 μm, or 500 nm to 4 μm, or 500 nm to 2 μm. In various embodiments, the plastic particles have a $d_{50}$ particle size in the range of 1 μm to 10 μm, or 1 μm to 8 μm, or 1 μm to 6 μm, or 1 μm to 4 μm, or 1 μm to 2 μm.

In some embodiments as described herein, the method as described herein further comprises sonicating the solubilizer and aqueous medium to reduce the size of the plastic particles in the suspension. In various embodiments, sonication reduces the particle size of the plastic particles in the suspension by at least 10%, or at least 25%, or at least 50%. For example, in various embodiments, sonication reduces the $d_{50}$ particle size of the plastic particles in the suspension by at least 10%, or at least 25%, or at least 50%. As such, after sonication, in various embodiments, the plastic particles have a $d_{50}$ particle size in the range of 50 nm to 900 nm, or 50 nm to 700 nm, or 50 nm to 500 nm, or 50 nm to 300 nm. In various embodiments, the plastic particles have a $d_{50}$ particle size in the range of 75 nm to 900 nm, or 75 nm to 700 nm, or 75 nm to 500 nm, or 75 nm to 300 nm, after sonication. In various embodiments, the nanoplastics have a $d_{50}$ particle size in the range of 100 nm to 900 nm, or 100 nm to 700 nm, or 100 nm to 500 nm, or 100 nm to 300 nm, after sonication.

In some embodiments as described herein, the method includes collecting the suspension of plastic particles. For example, the collecting may include liquid-liquid separation or evaporating the aqueous medium. In some embodiments as described herein, the method further comprises evaporating the aqueous medium and collecting the plastic particles. The method of evaporation is not particularly limited and can be selected by methods known in the art. For example, in some embodiments, evaporating comprising heating the suspension at a temperature and for a time sufficient to evaporate the aqueous medium and any excess solubilizer.

Evaporation may be conducted at at least 40° C. for at least 15 minutes, depending on the volume. Evaporation provides a way to collect the plastic particles. The collected plastic particles may be used for other purposes. Accordingly, in some embodiments, the method further comprises recycling the plastic particles. For example, in some embodiments, the collected plastic particles are provided to a plastics recycling facilities or plastic manufactures for further use and transformation into plastic objects.

Another aspect of the present disclosure provides a kit for determining a presence or concentration of microplastics and/or nanoplastics in an aqueous medium, the kit comprising: a first container configured to contain an aqueous medium collected from a natural water source, a waste water source, or a municipal water source; and a second container comprising an agglomerizer, wherein the agglomerizer comprises a compound with at least one $C_8$-$C_{32}$ hydrocarbon group.

In various embodiments as described herein, the first and second containers are formed from non-plastic materials. For example, in some embodiments as described herein, the first container is formed of glass. In some embodiments as described herein, the second container is formed of glass.

In some embodiments as described herein, the kit further comprises instructions for determining the presence of microplastics and/or nanoplastics in aqueous medium, wherein the instructions recite the methods as disclosed herein.

In some embodiments as described herein, the kit further comprises an indicator medium for indicating the presence of microplastics and/or nanoplastics. The indicator medium may change in the presence of nanoplastics or microplastics. For example, the indicator include a dye (e.g., as a liquid, or disposed on paper or other material). In some embodiments as described herein, the kit further comprises an optical lens (e.g., a magnifying glass). The optical lens may be used for directly observing and/or reviewing the separated and/or pre-separated plastics.

As described above, the second container comprises an agglomerizer. The agglomerizer may be selected from the agglomerizer as described herein.

Definitions

The following terms and expressions used herein have the indicated meanings.

Terms used herein may be preceded and/or followed by a single dash, "—", or a double dash, "=", to indicate the bond order of the bond between the named substituent and its parent moiety; a single dash indicates a single bond and a double dash indicates a double bond. In the absence of a single or double dash it is understood that a single bond is formed between the substituent and its parent moiety; further, substituents are intended to be read "left to right" (i.e., the attachment is via the last portion of the name) unless a dash indicates otherwise. For example, $C_1$-$C_6$ alkoxycarbonyloxy and —OC(O)$C_1$-$C_6$ alkyl indicate the same functionality; similarly arylalkyl and -alkylaryl indicate the same functionality.

The term "alkenyl" as used herein, means a straight or branched chain hydrocarbon containing from 2 to 10 carbons, unless otherwise specified, and containing at least one carbon-carbon double bond. Representative examples of alkenyl include, but are not limited to, ethenyl, 2-propenyl, 2-methyl-2-propenyl, 3-butenyl, 4-pentenyl, 5-hexenyl, 2-heptenyl, 2-methyl-1-heptenyl, 3-decenyl, and 3,7-dimethylocta-2,6-dienyl.

The term "alkoxy" as used herein, means an alkyl group, as defined herein, appended to the parent molecular moiety through an oxygen atom. Representative examples of alkoxy include, but are not limited to, methoxy, ethoxy, propoxy, 2-propoxy, butoxy, tert-butoxy, pentyloxy, and hexyloxy.

The term "alkyl" as used herein, means a straight or branched chain hydrocarbon containing from 1 to 10 carbon atoms unless otherwise specified. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, and n-decyl. When an "alkyl" group is a linking group between two other moieties, then it may also be a straight or branched chain; examples include, but are not limited to —CH$_2$—, —CH$_2$CH$_2$—, —CH$_2$CH$_2$CHC(CH$_3$)—, and —CH$_2$CH(CH$_2$CH$_3$)CH$_2$—.

The term "alkynyl" as used herein, means a straight or branched chain hydrocarbon group containing from 2 to 10 carbon atoms and containing at least one carbon-carbon triple bond. Representative examples of alkynyl include, but are not limited, to acetylenyl, 1-propynyl, 2-propynyl, 3-butynyl, 2-pentynyl, and 1-butynyl.

The term "saturated" as used herein means the referenced chemical structure does not contain any multiple carbon-carbon bonds. For example, a saturated cycloalkyl group as defined herein includes cyclohexyl, cyclopropyl, and the like.

The term "unsaturated" as used herein means the referenced chemical structure contains at least one multiple carbon-carbon bond, but is not aromatic. For example, an unsaturated cycloalkyl group as defined herein includes cyclohexenyl, cyclopentenyl, cyclohexadienyl, and the like.

The term "substituted", as used herein, means that a hydrogen radical of the designated moiety is replaced with the radical of a specified substituent, provided that the substitution results in a stable or chemically feasible compound. The term "substitutable", when used in reference to a designated atom, means that attached to the atom is a hydrogen radical, which can be replaced with the radical of a suitable substituent.

The phrase "one or more" substituents, as used herein, refers to a number of substituents that equals from one to the maximum number of substituents possible based on the number of available bonding sites, provided that the above conditions of stability and chemical feasibility are met. Unless otherwise indicated, an optionally substituted group may have a substituent at each substitutable position of the group, and the substituents may be either the same or different. As used herein, the term "independently selected" means that the same or different values may be selected for multiple instances of a given variable in a single compound.

The term "$d_{50}$", as used herein, is the median particle size, i.e., the size of the particle at which 50% of the particles are of larger particle size and 50% are of smaller particle size.

The term "particle size", as used herein, is the largest dimension of the particle.

The term "nanoplastics", as used herein, refers to a plastic particles with a particle size (e.g., an average particle size) that is less than 1 μm.

The term "microplastics", as used herein, refers to plastic particles with a particle size (e.g., an average particle size) that is less than 5 mm.

The term "macroplastics", as used herein, refers to plastic particles with a particle size (e.g., an average particle) greater than 5 mm.

EXAMPLES

The Examples that follow are illustrative of specific embodiments of the methods of the disclosure, and various uses thereof. They are set forth for explanatory purposes only, and are not to be taken as limiting the scope of the disclosure.

Example 1. Agglomeration of Plastic Polymers in Aqueous Media

Figure 2:
FIG. 2 is a picture of agglomerates prepared by the method as described herein.
Figure 2:
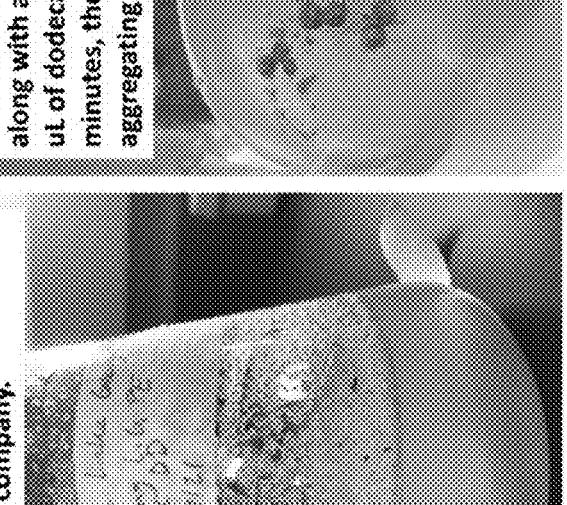

As shown in FIGS. 1-2 and summarized in Table 1 below, studies were conducted using the currently disclosed method for the agglomeration of polyethylene (PE) microplastics (MP) and for polyethylene (PE) mixed polyethylene terephthalate (PET) microplastics in water. In a ratio ranging between 100 to 220 µL liquid agglomerizer/100 mL water, a volume of liquid n-dodecane was added to a specified volume of water containing PE MP and also water containing PE mixed with PET microplastics. Further, as shown in FIG. 2, studies were conducted using real world PE microplastic waste in surface waters, both of which were retrieved from a contaminated pond.

FIGS. 3-6 illustrate the formation of suspensions of plastic particles in aqueous medium using the currently disclosed method. Plastic materials, including PE microplastics and other polymer MP and larger plastic pieces (i.e. macroplastics), were suspended in water by conversion of microplastics or macroplastics to nanoplastics with the addition of a specific ratio of liquid hydrocarbon, wherein the hydrocarbons include n-dodecane (pure compound) or similar compounds such as 2-dodecanone or kerosene (a mixture of hydrocarbons). Liquid hydrocarbons, such as n-dodecane or kerosene, were added to water containing thermoplastics, such as, PE, PS, PP, PC, polyamide (nylon) and PET. Said mixtures were stirred by vigorous shaking followed by ultrasound mixing. Nanoplastics suspensions were observed immediately after the mixing and reduced in size using ultrasonic mixing.

PE microplastics that are specifically labeled medium density polyethylene (MDPE) were purchased from Millipore Sigma (Burlington, MA, USA) with an average molecular weight (Av Mw)~4,000 g mol$^{-1}$ and an average Mn~1700, as determined by gel permeation chromatography (GPC), with a density (ρ) of 0.92 g/mL at 25° C. Ultrahigh

TABLE 1

| Plastic Type | Type of water | Volume of water (mL) | Volume of dodecane (µL) | Mass of Microplastics | Mass recovered as agglomerate | % Recovery as agglomerate |
|---|---|---|---|---|---|---|
| PE-pure | DI water | 100 | 200 | 0.5016 | 0.4144 | 83% |
| PE-pure | DI water | 100 | 200 | 0.5006 | 0.4664 | 93% |
| PE-pure | Lake Michigan | 200 | 200 | 0.5007 | 0.4405 | 88% |
| PE-pure | Tap water | 400 | 400 | 1.0037 | 0.9425 | 94% |
| PE-pure | DI water | 800 | 800 | 2.0027 | 1.7774 | 89% |
| Waste PE | Pond water | 400 | 400 | — | — | >90% |
| PE shavings from milk jug | Tap water | 400 | 400 | 0.7530 | 0.3676 | 50% |
| PE and PET-pure | Tap water | 400 | 400 | 0.61 | 0.60 | 98% |

As shown, the experiments conducted using the currently disclosed method with aqueous medium containing PE microplastics resulted in more than 85% PE recovered as agglomerates, which ranged in size from 3 to 11 mm. Studies conducted using the currently disclosed method with water containing PE mixed with PET microplastics yielded more than 95% PE/PET recovered as agglomerates. Studies conducted using the currently disclosed method using real world PE MP waste in water retrieved from a lake resulted in over 90% PE recovered as agglomerates. Similar aggregates have been created using polystyrene (PS) microplastics. Once formed, the agglomerates may be removed from the aqueous media.

Example 2. Formation of Suspensions of Plastic Particles in Aqueous Media

The following example demonstrate for the suspensions of plastics particles can be readily and reproducibly formed in aqueous conditions using agitation and ultrasound mixing of plastics in the presence of simple organic liquid solubilizers. A number of paraffin-type compounds, including scission products from polymer degradation, can solubilize plastics to form plastic particulates that readily suspend and homogeneously distribute in water.

molecular weight polyethylene, UHMWPE, average Mw of 3-6×10$^6$. PS, with an Av Mw of 35,000 g mol$^{-1}$ and ρ=1.06 g/mL at 25° C., and PP, Av Mw=12,000 g mol$^{-1}$ and ρ=0.9 g/mL were also purchased from Millipore Sigma. PET semi-crystalline granules were purchased from GoodFellow (125 Hookstown Grade Road, Coraopolis, PA 15108-9302, USA). Solubilizer compounds n-dodecane (>99.0%), 2-dodecanone (>97%), toluene (reagent grade) and kerosene (reagent grade) were sourced from Millipore Sigma. The source of n-undecane (synthesis grade) was EMD Millipore Corp. Laboratory water mixtures were prepared with Millipore MilliQ deionized water (18.2 MΩ). Real world waste plastic materials included a milk jug, water bottle, plastic cup, plastic bag and safety glasses and aged plastics were collected from the local environment at least three years ago and stored in an open container in the lab. These were cleaned and thoroughly rinsed with laboratory deionize water and dried prior to use. The identity of these plastic materials was verified using IR Spectroscopy. These plastic materials were either ground into MP sizes using an industrial blender or cut into pieces to represent macro-size plastic.

Figure 3:
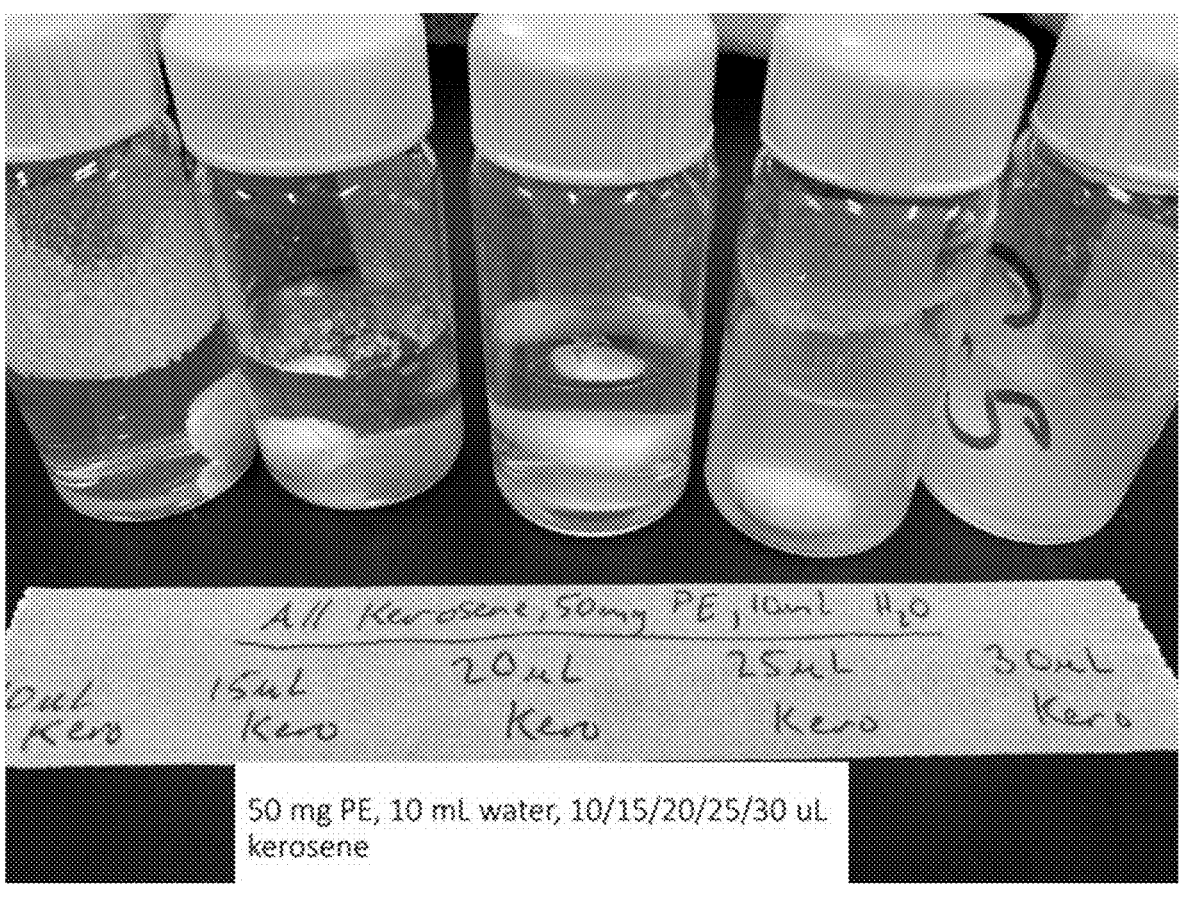
FIG. 3 is a picture of agglomerates prepared by the method as described herein.

Subsequently, it was observed that the addition of small volumes of n-dodecane (10-30 µL) to 10 mL aqueous mixtures of PE MP created cloudy suspensions after vigorous shaking. The plastic particles homogeneously dispersed in water were reproducibly made using 18 mL of water, 20 µL of n-dodecane and commercial PE microplastic particles. The average size of suspended PE particles in the cloudy suspension, measured after 2 minutes of vigorous hand-shaking, was 1.3 (±0.2) µm. The particle sizes ranged from 600 nm to 2.0 µm for the commercial PE, smaller than the average size of 3.1±0.9 µm and range of 1.8-4.9 µm for (real world) milk jug PE. No particles were detected for mixtures containing only PE in water. FIG. 3 shows samples of studies conducted using the currently disclosed method using PE microplastic in water with different amounts of liquid kerosene to demonstrate the importance of the specific quantitative addition are formed using 20-50 microliters of kerosene or n-dodecane (or other said compounds) in 10 mL of water.

Table 2 shows the average particle sizes of the plastic particles that formed suspensions in water after the addition of n-dodecane or, in the case of PET, 2-dodecanone. This transition from insoluble macro or microplastics in water to suspended plastic particles was accomplished using pristine, commercial polymers, real-world plastics and aged plastic materials. The solubilizer compound remained in solution for all the measured suspensions. For all three types of plastics, the real-world plastic particle suspensions were similar in size to the commercial plastic materials or slightly larger.

TABLE 2

| Polymer type and description | Particle size range (µm) | Average particle size (µm) |
|---|---|---|
| PE - commercial | 0.9-2.0 | 1.3 ± 0.2 |
| PE - milk jug | 1.8-4.9 | 3.1 ± 0.9 |
| PE - aged real world | 1.6-4.9 | 2.5 ± 0.7 |
| PET - commercial | 1.5-4.9 | 3.4 ± 0.9 |
| PET - water bottle | 3.0-5.6 | 4.4 ± 0.7 |
| PET - aged real world | 3.3-5.6 | 4.4 ± 0.5 |
| PS - commercial | 1.3-2.5 | 1.8 ± 0.6 |
| PS - EPS product | 1.4-3.1 | 2.3 ± 0.5 |
| PS - aged real world | 0.9-4.5 | 2.0 ± 0.7 |

Figure 4:
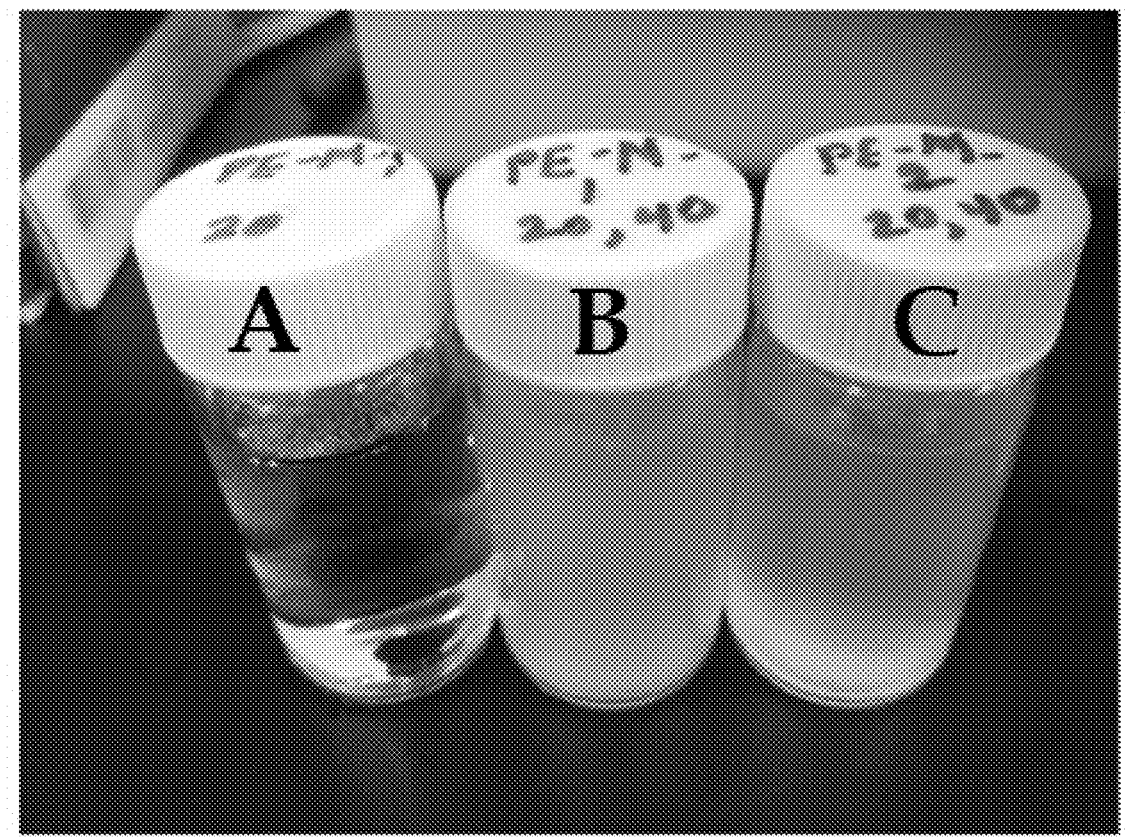
FIG. 4 is a picture of suspensions prepared by the method as described herein.

Extended ultrasound treatment created smaller nanoparticle. FIG. 4 shows samples of a study conducted using the currently disclosed method with medium density PE in water and n-dodecane. Sample (A) shows medium density PE in water. Samples (B) and (C) show medium density PE in water with n-dodecane after vigorous shaking and ultrasound mixing for 30 minutes using the currently disclosed method. A suspension of PE is observed as a cloudy solution. Unsuspended solids, were readily removed by physical and/or mechanical means, such as with a spatula or filtration.

Figure 5:
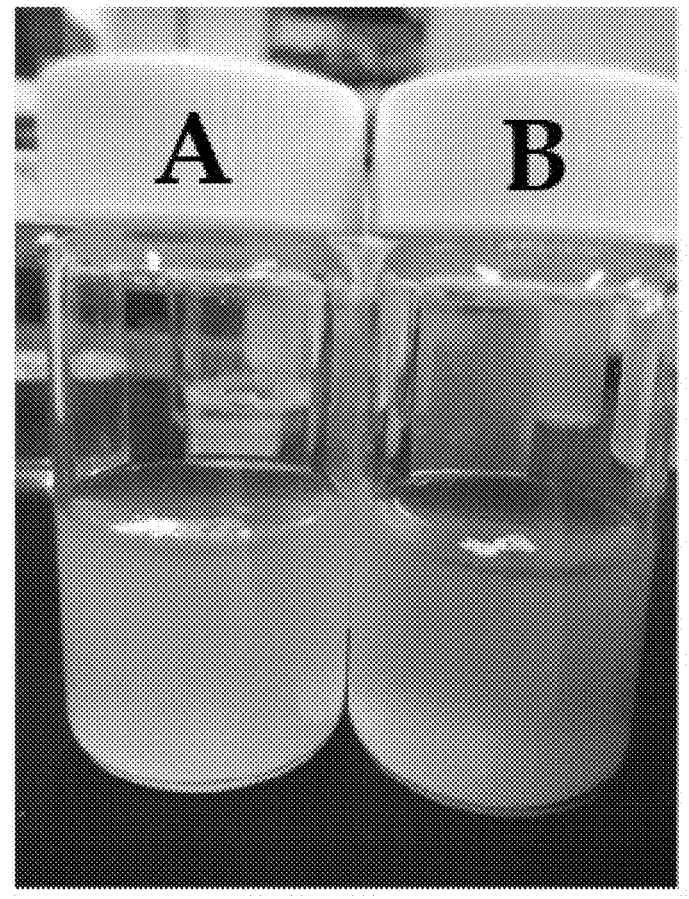
FIG. 5 is a picture of suspensions prepared by the method as described herein.

Similarly, FIG. 5 shows two samples of a study conducted using the currently disclosed method with PET in water and n-dodecane after mixing. Suspension of PET is readily observed in Sample (B). A portion of undissolved PET are seen floating on the top of the suspension, which are easily removed with the appropriate filtration method. The plastic particles formed remain suspended after the addition of other solutes, for example common salts, such as sodium chloride and potassium hydrogen phosphate.

Figure 6A:
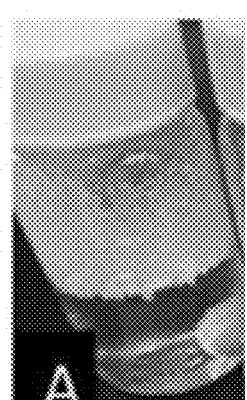
FIG. 6A is a picture of polyethylene in water.
Figure 6B:
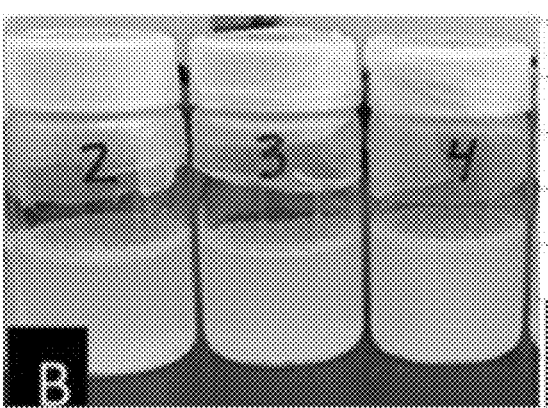
FIG. 6B is a picture of polyethylene suspensions prepared by the method as described herein.
Figure 6C:
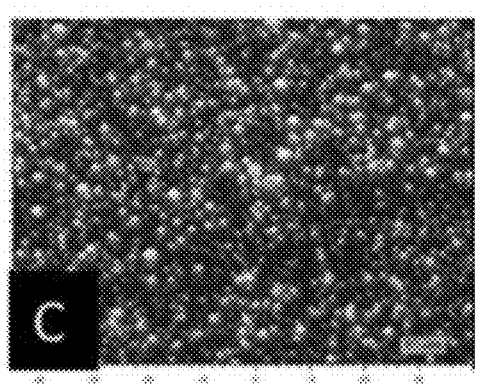
FIG. 6C is a light microscopy image of a polyethylene suspension prepared by the method as described herein.
Figure 6D:
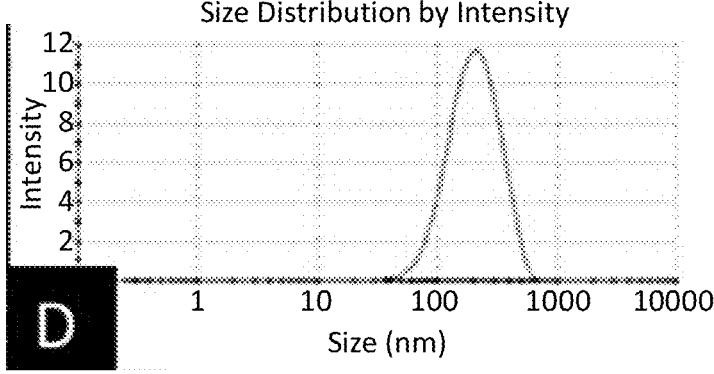
FIG. 6D is a graph of the particle size distribution of a polyethylene suspension prepared by the method as described herein.

FIGS. 6A-6B show additional studies conducted using the currently disclosed method. FIG. 6A shows (A) PE in water; (B) PE suspended in water after the addition of n-dodecane, shaking and ultrasound mixing for 30 minutes; FIG. 6B shows (C) dark field polarized light microscopy image of PE suspensions after deposition and drying on a slide with a bar scale of 10 µm; and (D) particle size distribution for PE suspended in water. The average sizes of PE suspension fall in the range of a few hundred nanometers. Raman analysis of PE suspensions showed that the added liquid hydrocarbon, e.g. n-dodecane, remains on the formed NP. This additive can be removed by heating or liquid extraction.

After the suspension was formed, the liquid hydrocarbon additives could be removed by applying low heat treatment, 40-55° C., for 40+ hours, depending on the total volume, or through liquid-liquid extraction with a water immiscible solvent such as toluene. The suspended plastic particles can be recovered by evaporation of solvent. The recovery of plastic via such suspensions may constitute an important step in the re-manufacturing of plastics into new plastic for sustainable recycling processes.

Example 3. Formation of Suspensions of Plastic Particles from Real-World Sources The suspension from a number of real world (product) plastics created by this method with ultrasound mixing were analyzed and compared to the commercial pure plastics. As summarized in Table 3 below, the average sizes are dependent upon the types of plastic material and other factors such as the solubilizer.

TABLE 3

| Plastic | Solubilizer | NP size (nm) |
|---|---|---|
| MDPE | Dodecane | 338 ± 14 |
| UHMWPE | Dodecane | 358 ± 9 |
| Milk-jug PE | Kerosene | 528 ± 19 |
| PET | Dodecane | 724 ± 14 |
| PET | Kerosene | 516 ± 28 |
| PS | Dodecane | 700 ± 13 |

The milk-jug PE shows a slightly larger average particle size for equivalent sonication time as compared to the commercial PE, which correlates to the slightly larger particle sizes of these materials after hand-shaking (Table 2). Sonicated PET and PS had mostly larger peak distribution values than all forms of PE NP, similar to the hand shaking trends. Moreover, these suspensions are extremely stable; effectively equal particle size distributions were measured for up to three months after formation (see FIG. 9C). Without being bound by theory, the present inventors hypothesize that the size distributions of these NP suggest that these polymers are naturally present at an expansive range of sizes in aqueous media. This is important, as studies have shown size-dependent cellular responses to nanoparticle pollutants and differences in biochemical disruptions for nanoparticles of 50 or 100 nm sizes compared to those 200 nm and larger.

Figure 7A:
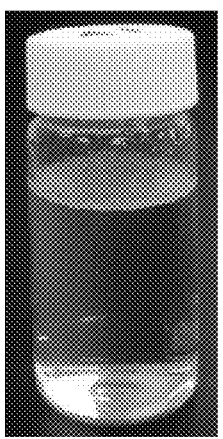
FIG. 7A is a picture of polyethylene microplastics in water.
Figure 7B:
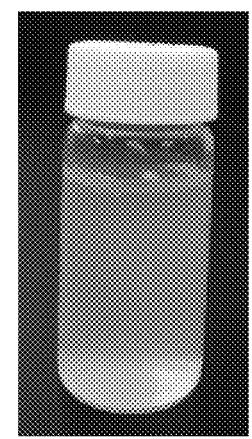
FIG. 7B is a picture of a polyethylene suspension prepared by the method as described herein.
Figure 7C:
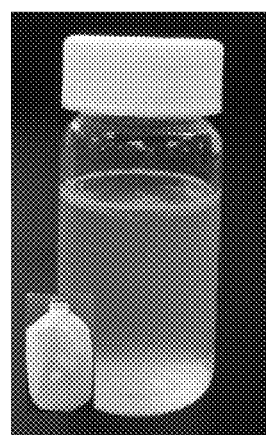
FIG. 7C is a picture of a polyethylene suspension created from a polyethylene milk jug and prepared by the method as described herein.
Figure 7D:
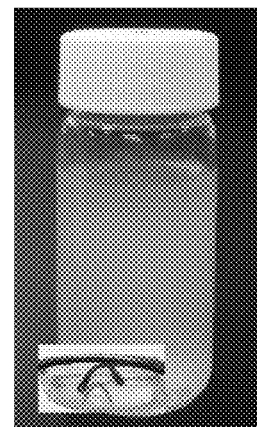
FIG. 7D is a picture of a polycarbonate suspension created from shavings from a pair of safety glasses and prepared by the method as described herein.
Figure 7E:
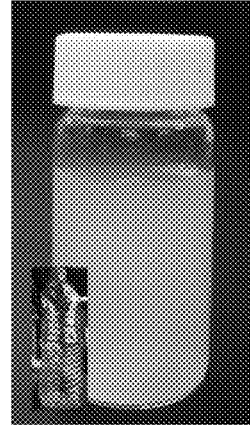
FIG. 7E is a picture of a polyethylene terephthalate suspension created from shavings from a polyethylene terephthalate water bottle and prepared by the method as described herein.

FIGS. 7A-7E show the resulting suspensions with the real-world plastics described above. Addition of small volumes of n-dodecane (15-30 µL) to a 10 mL aqueous mixture of PE microplastics created cloudy suspensions after short, vigorous stirring. Upon further mixing in an ultrasound bath, additional cloudiness was observed. FIG. 7A shows a mixture of the PE microplastics in water, and FIG. 7B shows a cloudy suspension created after the addition of n-dodecane to the same mixture, after one minute of vigorous shaking and 30 minutes of ultrasound mixing. The suspension was analyzed and verified as a suspension of PE particles. Extension of this methodology to other plastics and organic solubilizers resulted in similar suspensions. For example, FIG. 7C shows a suspension created from a PE milk jug using n-dodecane as the solubilizer, and FIG. 7D is a suspension of polycarbonate (PC) created from shavings from a pair of safety glasses, using 2-dodecanone as the solubilizer. The suspension shown in FIG. 7E was prepared using a 10 mg piece of PET from a water bottle and 20 μL of kerosene as the solubilizer. The long-term stability of these suspensions is dependent on several factors, such as polymer type, amount of organic solubilizer and extent of mixing.

Figure 8A:
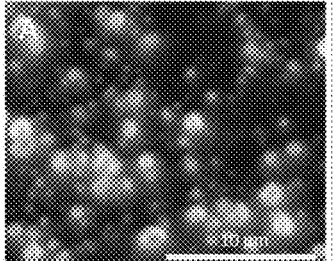
FIG. 8A is a dark field microscopy image of a polyethylene suspension prepared by the method as described herein.
Figure 8B:
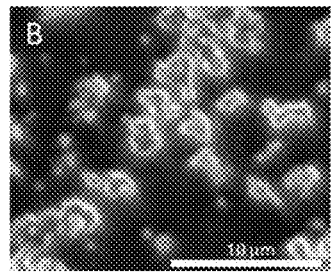
FIG. 8B is a dark field microscopy image of a polyethylene suspension created from a polyethylene milk jug and prepared by the method as described herein.
Figure 8C:
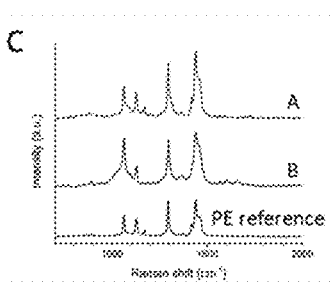
FIG. 8C is a Raman spectrum of a polyethylene suspension prepared by the method as described herein and a polyethylene suspension created from a polyethylene milk jug and prepared by the method as described herein.
Figure 8D:
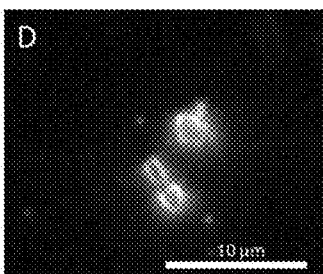
FIG. 8D is a dark field microscopy image of polyethylene terephthalate prepared by the method as described herein.
Figure 8E:
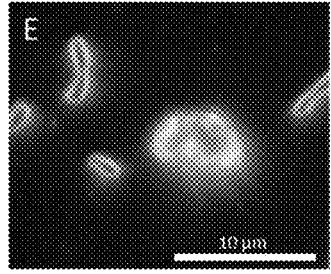
FIG. 8E is a dark field microscopy image of polyethylene terephthalate created from a polyethylene terephthalate water bottle prepared by the method as described herein.
Figure 8F:
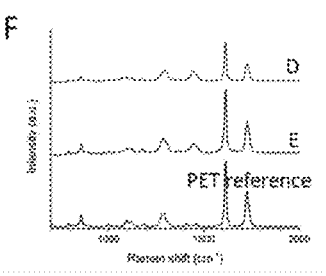
FIG. 8F is a Raman spectrum of a polyethylene terephthalate suspension prepared by the method as described herein and a polyethylene terephthalate suspension created from a polyethylene terephthalate water bottle and prepared by the method as described herein.
Figure 8G:
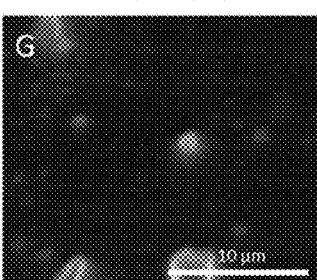
FIG. 8G is a dark field microscopy image of polystyrene prepared by the method as described herein.
Figure 8H:
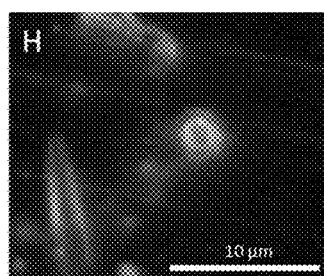
FIG. 8H is a dark field microscopy image of polystyrene from a real-world source and prepared by the method as described herein.
Figure 8I:
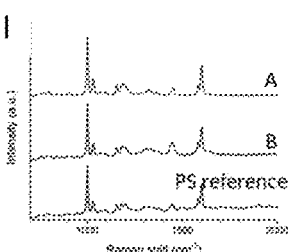
FIG. 8I is a Raman spectrum of a polystyrene suspension prepared by the method as described herein and a polyethylene polystyrene created from real-world source and prepared by the method as described herein.

The chemical surface identity, sizes and shapes of NP created by the currently disclosed method were confirmed using optical microscopy with Raman spectroscopy. Polyethylene suspensions prepared using commercially obtained medium density polyethylene (MDPE) were found to be mostly spherical in shape and ranged in size from a few microns to less than 300 nm in diameter (FIG. 8A). The acquired Raman spectrum verified the imaged spheres were PE suspended in water (FIG. 8C) and, in some cases, part of the spectrum matched n-dodecane when this solubilizer was not removed from the suspension. Upon analysis of the PE suspension formed from pieces of a PE milk jug (FIG. 8B), the larger particles appeared to have a rougher texture and were more variable in shape. Some of the particles had a fibrous shape, which was not observed with the commercial PE. Particles formed from commercially obtained PET were observed as spherical shapes in a wide range of sizes (FIG. 8D). The stable particles—defined here as those that remained suspended more than 24 hours—from water bottle PET using n-dodecane or 2-dodecanone as the solubilizer were more uniform in size, but less spherical (FIG. 8E). Raman spectral analysis of larger particles from both samples (FIG. 8F) confirmed their identity as PET. Aqueous suspensions of PS formed from commercial or real-world sources using n-dodecane as the solubilizer were spherical and PS was identified in the spectral analysis. (FIGS. 8G, 8H, and 8I) Different from PE and PET, the real world PS were consistently observed as spherical.

Figure 9A:
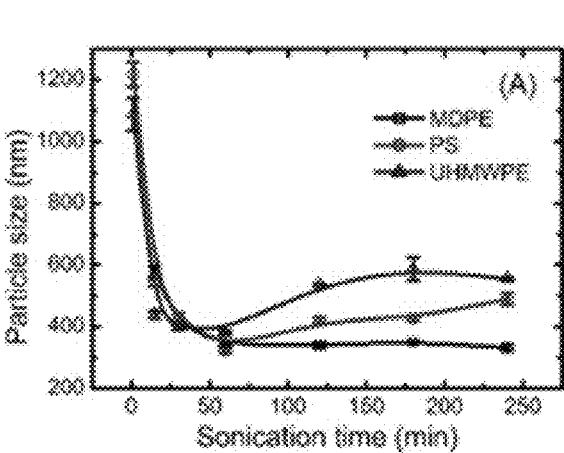
FIG. 9A is graph of the average particle size of suspensions prepared by the method as described herein versus sonication time.
Figure 9B:
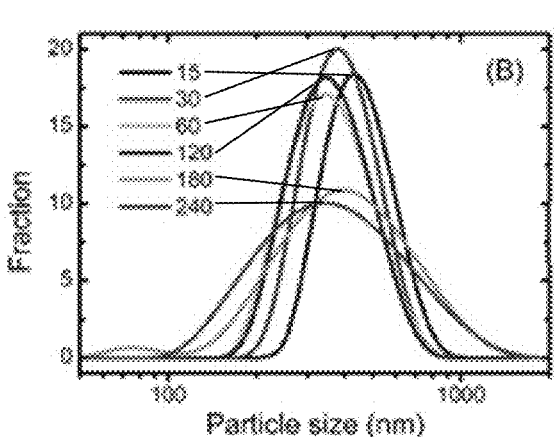
FIG. 9B is graph of the size distribution of suspensions prepared by the method as described herein versus sonication time.

The currently disclosed method for the formation of suspensions of plastic particles in water begins with the vigorous mixing of a specific amount of organic solubilizer with the plastic, which simulates numerous real-world scenarios and creates particles of a certain size range. Particle formation can then be modified with ultrasound mixing, to produce particles of different size distributions. The extent of formation, as well as the particles size distribution, is strongly dependent upon the sonication time, as shown in FIG. 9A for commercial plastics MDPE, PS, and ultrahigh molecular weight PE (UHMWPE). These samples were initially mm-sized particles suspended in water (FIG. 7A). The time zero size distributions shown in FIG. 9A were generated after 1.0 minute of vigorous mixing. The particle sizes then decreased with longer sonication times, and for all three suspensions an average minimum value of ca. 340 nm was reached after 60 minutes of sonication. After this time, the particle size distribution broadened (see FIG. 9A). In addition, for PS and UHMWPE, the average particle size also slightly increased with further sonication time.

Figure 9C:
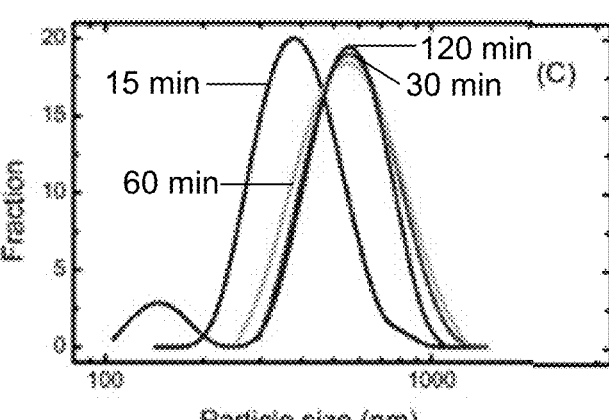
FIG. 9C is graph of the size distribution of suspensions prepared by the method as described herein versus sonication time.

The different initial size distributions obtained for commercial MDPE/n-dodecane, compared to milk-jug PE/kerosene are shown in FIG. 9C. The latter shows a slightly larger average particle size for equivalent sonication time (see also Table 3, 30-60 minutes sonication). The use of kerosene instead of dodecane yielded slightly lower average size distribution. PET and PS NP were generally larger than all forms of PE. Moreover, these suspensions are extremely stable: effectively equal particle size distributions were measured for up to three months after formation.

Figure 10A:
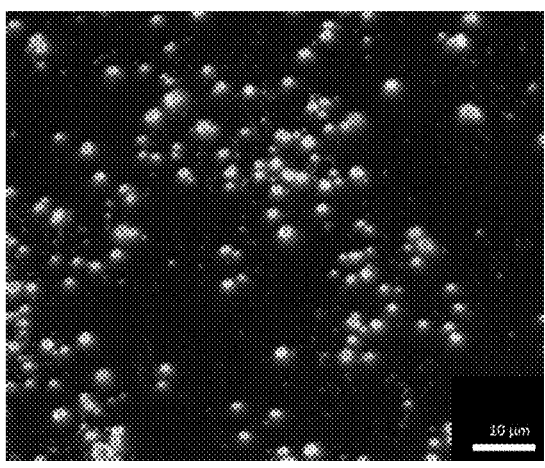
FIG. 10A is a dark field microscopy image of pure polyethylene particles before the removal of the solubilizer as described herein.
Figure 10B:
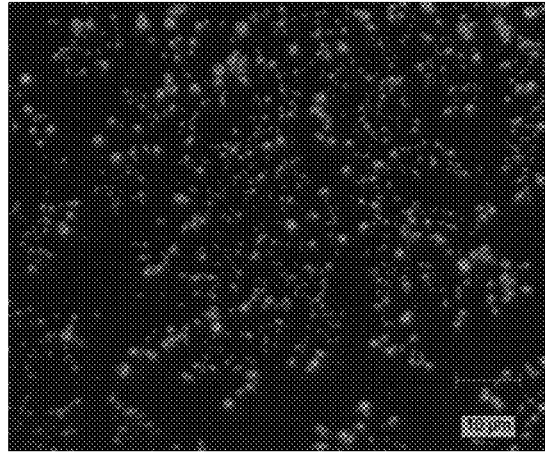
FIG. 10B is a dark field microscopy image of pure polyethylene particles after the removal of the solubilizer as described herein.

To further explore the function of the organic solubilizer in the suspensions, the added organic was deliberately removed by organic solvent extractions and subsequent heating. After the removal of over 99% of the n-dodecane from the aqueous suspension, as measured by SPME/GCMS, the suspension became less cloudy. This treated solution was analyzed with dark field microscopy and 100× images are shown in FIG. 10A and FIG. 10B. The plastic particles again were a range of sizes, and observed through image analysis to be smaller than the particles in the presence solubilizer molecules. The notable decrease in the cloudiness of the aqueous suspension corresponds with smaller sized particles; this was observed upon removal of the solubilizer n-dodecane from PE and PP suspensions.

The particle size distributions of suspensions can be tailored by using different plastic feedstocks, solubilizer selection as well as type of mixing (hand-mixing/length of sonication). Thus, this straightforward method for suspension of plastic particles in water has the potential to advance future research, notably studies of the human biological responses to these pollutants formed from real-world plastic materials. Serendipitously, this facile formation of plastic suspensions in water may also provide a solution for environmental remediation and the chemical recycling of plastic, which relies on the conversion of polymers back to smaller units, either the original monomers or oligomers for remanufacturing purposes. Since the chemical properties of plastic have traditionally required the use of hazardous solvents, these suspensions in water may offer a greener, nonhazardous, environmentally friendly pathway for chemical recycling.

Figure 11:
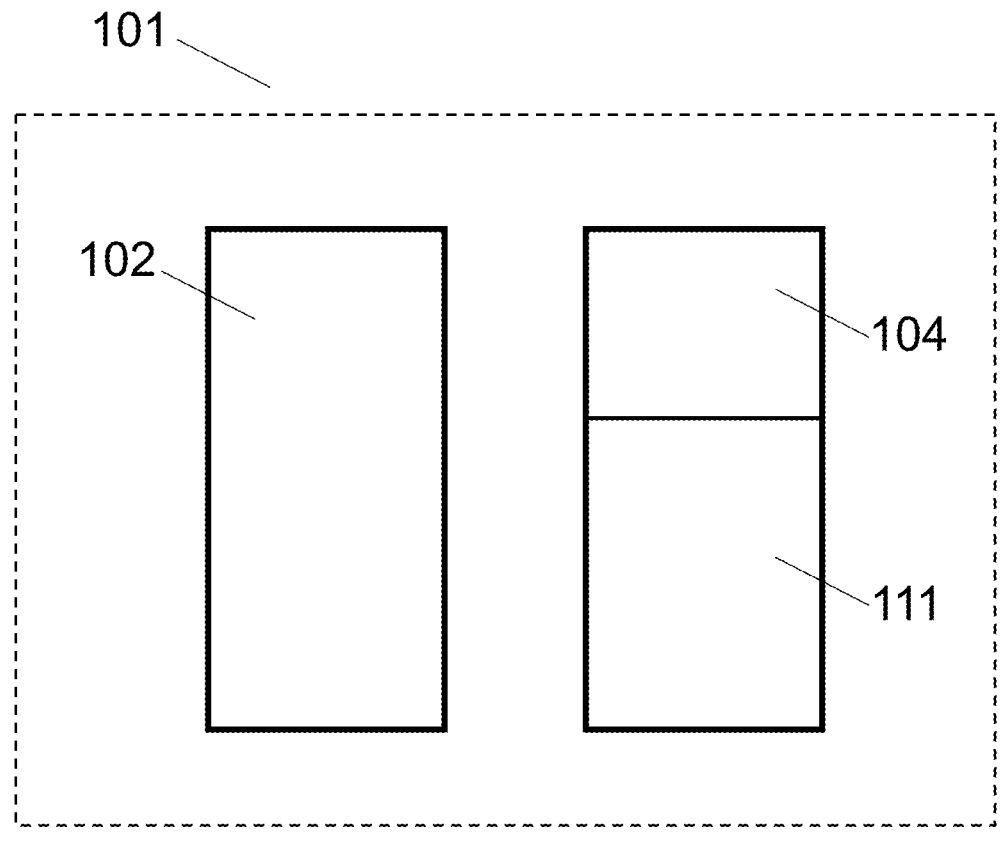
FIG. 11 is a schematic of a kit as described herein.

The present disclosure also provides for a kit for determining a presence or concentration of microplastics and/or nanoplastics in an aqueous medium. As shown in FIG. 11, the kit (101) comprises a first container (102) configured to contain an aqueous medium collected from a natural water source, a waste water source, or a municipal water source; and a second container (104) comprising an agglomerizer (111), wherein the agglomerizer comprises a compound with at least one $C_8$-$C_{32}$ hydrocarbon group.

Example 4. Agglomeration of Polyester in Aqueous Medium

Figure 12A:
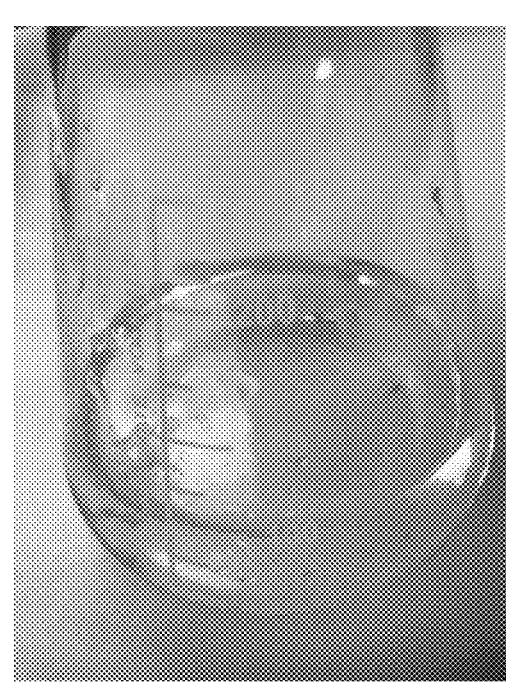
FIG. 12A is a picture of microfibers dispersed in an aqueous medium.
Figure 12B:
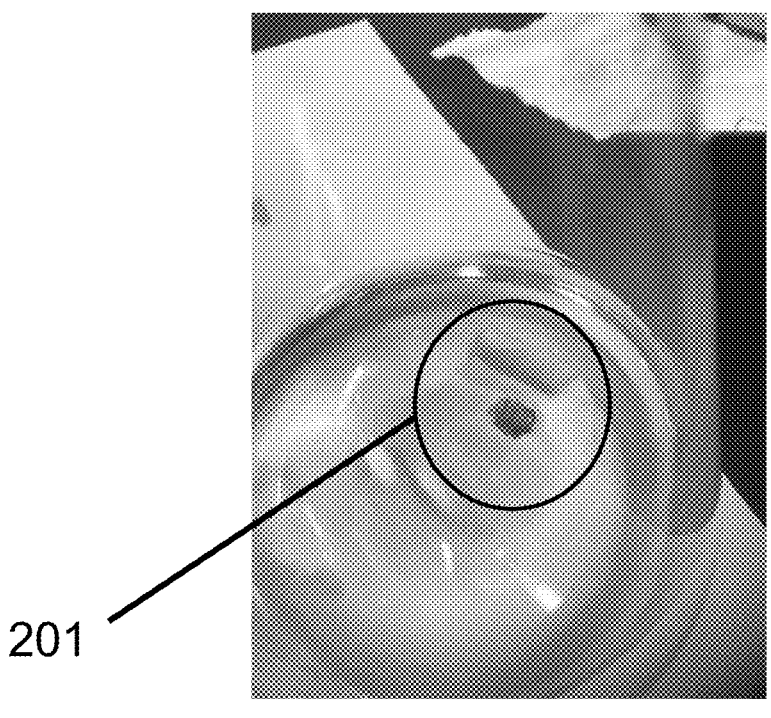
FIG. 12B is a picture of an agglomerate prepared by the method as described herein.

As described above, the aqueous medium may originate from a waste water source. When the waste water source is treated, it is common that the water is still contaminated with microfibers, such as those made from polyester. To test the currently disclosed method on treated waste water source, a mixture of synthetic microfibers (e.g., polyester) and water (approximately 100 mL) was prepared. A picture of this mixture is shown in FIG. 12A. To this mixture, 600 μL of 2-dodecanone was added and mixed to form an agglomerate. FIG. 12B is a picture of an agglomerate (201) of polyester as formed by the method disclosed.

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings and/or examples making apparent to those skilled in the art how the several forms of the disclosure may be embodied in practice. Thus, before the disclosed processes and devices are described, it is to be understood that the aspects described herein are not limited to specific embodiments, apparatuses, or configurations, and as such can, of course, vary. It is also to be understood that the terminology used herein is for the purpose of describing particular aspects only and, unless specifically defined herein, is not intended to be limiting.

The terms "a," "an," "the" and similar referents used in the context of describing the disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. It will be further understood that the endpoints of each of the ranges are significant both in relation to the other endpoint, and independently of the other endpoint.

All methods described herein can be performed in any suitable order of steps unless otherwise indicated herein or otherwise clearly contradicted by context. The use of any and all examples, or exemplary language (e.g., "such as") provided herein is intended merely to better illuminate the disclosure and does not pose a limitation on the scope of the disclosure otherwise claimed. No language in the specification should be construed as indicating any non-claimed element essential to the practice of the disclosure.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

As will be understood by one of ordinary skill in the art, each embodiment disclosed herein can comprise, consist essentially of or consist of its particular stated element, step, ingredient or component. As used herein, the transition term "comprise" or "comprises" means includes, but is not limited to, and allows for the inclusion of unspecified elements, steps, ingredients, or components, even in major amounts. The transitional phrase "consisting of" excludes any element, step, ingredient or component not specified. The transition phrase "consisting essentially of" limits the scope of the embodiment to the specified elements, steps, ingredients or components and to those that do not materially affect the embodiment.

Unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

Groupings of alternative elements or embodiments of the disclosure disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Some embodiments of this disclosure are described herein, including the best mode known to the inventors for carrying out the disclosure. Of course, variations on these described embodiments will become apparent to those of ordinary skill in the art upon reading the foregoing description. The inventor expects skilled artisans to employ such variations as appropriate, and the inventors intend for the disclosure to be practiced otherwise than specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Furthermore, it is to be understood that the embodiments of the disclosure disclosed herein are illustrative of the principles of the present disclosure. Other modifications that may be employed are within the scope of the disclosure. Thus, by way of example, but not of limitation, alternative configurations of the present disclosure may be utilized in accordance with the teachings herein. Accordingly, the present disclosure is not limited to that precisely as shown and described.

I claim:

1. A method comprising:
   providing an aqueous medium comprising at least one of microplastics and nanoplastics;
   combining an agglomerizer and the aqueous medium, wherein the agglomerizer has at least one $C_8$-$C_{32}$ hydrocarbon group;
   mixing the agglomerizer and aqueous medium to form at least one agglomerate of the at least one microplastics and nanoplastics having a $d_{50}$ particle size in the range of 1 to 100 mm; and
   separating the at least one agglomerate from the aqueous medium.

2. The method of claim 1, wherein the aqueous medium originates from a natural water source, a waste water source, or a municipal water source.

3. The method of claim 1, wherein the aqueous medium comprises microplastics having a $d_{50}$ particle size of no more than 5 mm.

4. The method of claim 1, wherein the aqueous medium comprises nanoplastics having a $d_{50}$ particle size of no more than 1 μm.

5. The method of claim 1, wherein the at least one of the microplastics and nanoplastics are individually selected from polyester, polyethylene, polystyrene, polypropylene, polycarbonate, polyamide, polyethylene terephthalate, poly (methyl methacrylate), or mixtures thereof.

6. The method of claim 1, wherein the agglomerizer is combined with the aqueous medium in a ratio of at least 0.001:1 by volume.

7. The method of claim 1, wherein the at least one $C_8$-$C_{32}$ hydrocarbon group is selected from a $C_8$-$C_{32}$ alkyl, a $C_8$-$C_{32}$ alkenyl, or a $C_8$-$C_{32}$ alkoxy, a $C_8$-$C_{32}$ carboxylic acid, or a $C_8$-$C_{32}$ ketone.

8. The method of claim 1, wherein the agglomerizer is selected from octane, nonane, decane, undecane, dodecane, tridecane, tetradecane, hexadecane, octadecane, octene, nonene, decene, undecene, dodecene, tridecene, tetradecene, hexadecane, octadecene, octanol, nonanol, decanol, undecanol, dodecanol, tridecanol, tetradecanol, hexadecanol, octadecanol, 2-octanone, 2-nonanone, 2-decanone, 2-undecanone, 2-dodecanone, 2-tridecanone, 2-tetradecanone, 2-hexadecanone, 2-octadecanone, or mixtures thereof.

9. The method of claim 1, wherein mixing the agglomerizer and aqueous medium is conducted by vortex mixing.

10. The method of claim 1, wherein the at least one agglomerate has a $d_{50}$ particle size in the range of 3-50 mm.

11. The method of claim 1, wherein the separating the at least one agglomerate from the aqueous medium comprises filtering the at least one agglomerate from the aqueous mixture.

12. The method of claim 1, wherein the aqueous medium comprises microplastics having a $d_{50}$ particle size in the range of 10 μm to 5 mm.

13. The method of claim 1, wherein the aqueous medium comprises nanoplastics having a $d_{50}$ particle size in the range of 1 nm to 1 μm.

14. The method of claim 1, wherein the agglomerizer is combined with the aqueous medium in the range of 0.001:1 to 0.05:1 by volume.

15. The method of claim 1, wherein mixing the agglomerizer and the aqueous medium is conducted at room temperature.

16. The method of claim 1, wherein the at least one agglomerate comprises at least 85 wt % plastic, by weight of the agglomerate.

17. The method of claim 1, further comprising recycling the at least one agglomerate.

18. The method of claim 1, wherein the method provides at least 50% recovery of the at least one microplastics and/or nanoplastics as at least one agglomerate.

19. A kit for determining a presence or concentration of microplastics and/or nanoplastics in an aqueous medium, the kit comprising:

a first container configured to contain an aqueous medium collected from a natural water source, a waste water source, or a municipal water source;

a second container comprising an agglomerizer, wherein the agglomerizer comprises a compound with at least one $C_8$-$C_{32}$ hydrocarbon group; and instructions for determining the presence of microplastics and/or nanoplastics in aqueous medium, wherein the instructions recite the method of claim 1.

\*   \*   \*   \*   \*